(12) United States Patent
Knebl et al.

(10) Patent No.: US 11,388,552 B2
(45) Date of Patent: Jul. 12, 2022

(54) WIRELESS NETWORK SERVICE ASSESSMENT

(71) Applicant: Ookla, LLC, Hollywood, CA (US)

(72) Inventors: Matthew Knebl, Alisa Viejo, CA (US); Andrei Covaliov, North Bend, WA (US); Artem Koltsov, Grants Pass, OR (US)

(73) Assignee: OOKLA, LLC, Los Angeles, CA (US)

( * ) Notice: Subject to any disclaimer, the term of this patent is extended or adjusted under 35 U.S.C. 154(b) by 6 days.

(21) Appl. No.: 16/792,652

(22) Filed: Feb. 17, 2020

(65) Prior Publication Data

US 2020/0336862 A1 Oct. 22, 2020

Related U.S. Application Data

(63) Continuation of application No. 16/381,961, filed on Apr. 11, 2019, now Pat. No. 10,567,922.

(60) Provisional application No. 62/761,924, filed on Apr. 11, 2018.

(51) Int. Cl.
| | |
|---|---|
| *H04W 4/029* | (2018.01) |
| *H04W 4/33* | (2018.01) |
| *H04B 17/336* | (2015.01) |
| *H04W 84/12* | (2009.01) |
| *H04B 17/318* | (2015.01) |

(52) U.S. Cl.
CPC .............. *H04W 4/029* (2018.02); *H04W 4/33* (2018.02); *H04B 17/318* (2015.01); *H04B 17/336* (2015.01); *H04W 84/12* (2013.01)

(58) Field of Classification Search
CPC ..... H04W 24/02; H04W 16/18; H04W 4/029; H04W 84/12; H04W 4/02; H04W 4/33; H04B 17/318; H04B 17/336
See application file for complete search history.

(56) References Cited

U.S. PATENT DOCUMENTS

| | | | |
|---|---|---|---|
| 9,191,781 | B2 | 11/2015 | Kumar |
| 9,215,560 | B1 | 12/2015 | Jernigan |
| 9,310,462 | B2 | 4/2016 | Chintalapudi et al. |
| 9,503,858 | B2 | 11/2016 | Palanki et al. |
| 9,609,539 | B2 | 3/2017 | Edge et al. |
| 9,635,516 | B1 | 4/2017 | Gu et al. |
| 9,843,890 | B2 | 12/2017 | Do et al. |
| 9,983,291 | B2 | 5/2018 | Do et al. |
| 9,998,856 | B2 | 6/2018 | Edge |

(Continued)

OTHER PUBLICATIONS

Communication Pursuant to Rule 164(1) EPC for European Application No. 19784765.0 dated Nov. 24, 2021, 10 pages.

(Continued)

*Primary Examiner* — Margaret G Mastrodonato
(74) *Attorney, Agent, or Firm* — Womble Bond Dickinson (US) LLP

(57) ABSTRACT

Methods of creating an indoor confidence level comprising: receiving a location and location accuracy value from or for a device, wherein the location accuracy value is equated to a location accuracy circle; comparing the location and location accuracy circle to a map of known buildings and outdoor locations; and defining an indoor confidence level based upon the percent of overlap of the accuracy radius to a building on said map; and methods of defining an optimization priority among a set of collected data points for network connectivity.

12 Claims, 14 Drawing Sheets

(56) References Cited

U.S. PATENT DOCUMENTS

| | | |
|---|---|---|
| 10,038,981 B2 | 7/2018 | Pon et al. |
| 10,123,175 B2 | 11/2018 | Iun et al. |
| 10,129,691 B2 | 11/2018 | Cerchio et al. |
| 10,129,777 B2 | 11/2018 | Austin et al. |
| 10,136,342 B2 | 11/2018 | Anantha et al. |
| 2004/0268162 A1 | 12/2004 | Morisawa |
| 2011/0177826 A1 | 7/2011 | Huang et al. |
| 2012/0087212 A1 | 4/2012 | Vartanian et al. |
| 2013/0131973 A1 | 5/2013 | Friedler et al. |
| 2015/0024772 A1 | 1/2015 | Das et al. |
| 2015/0319626 A1* | 11/2015 | Yi .................... H04W 72/1226 370/329 |
| 2016/0066146 A1 | 3/2016 | Jernigan |
| 2016/0080811 A1 | 3/2016 | Fukushima et al. |
| 2016/0116274 A1 | 4/2016 | Meredith et al. |
| 2016/0360380 A1 | 12/2016 | Huang et al. |
| 2017/0272319 A1* | 9/2017 | Sheen .................. H04W 24/02 |
| 2017/0332344 A1 | 11/2017 | Rao et al. |
| 2017/0345070 A1 | 11/2017 | Goldberg et al. |
| 2018/0041916 A1 | 2/2018 | Henderson et al. |
| 2018/0070212 A1 | 3/2018 | De Lorenzo |
| 2018/0295528 A1* | 10/2018 | Anantha ............... H04W 24/08 |
| 2018/0352309 A1* | 12/2018 | Hopcraft ............... H04W 16/18 |
| 2019/0289514 A1* | 9/2019 | Ronen ............... H04W 72/0453 |

OTHER PUBLICATIONS

Non-Final Office Action for U.S. Appl. No. 16/790,914 dated Aug. 18, 2021, 19 pages.
Supplementary European Search Report for European Application No. 19784765 dated Mar. 4, 2022, 10 pages.

* cited by examiner

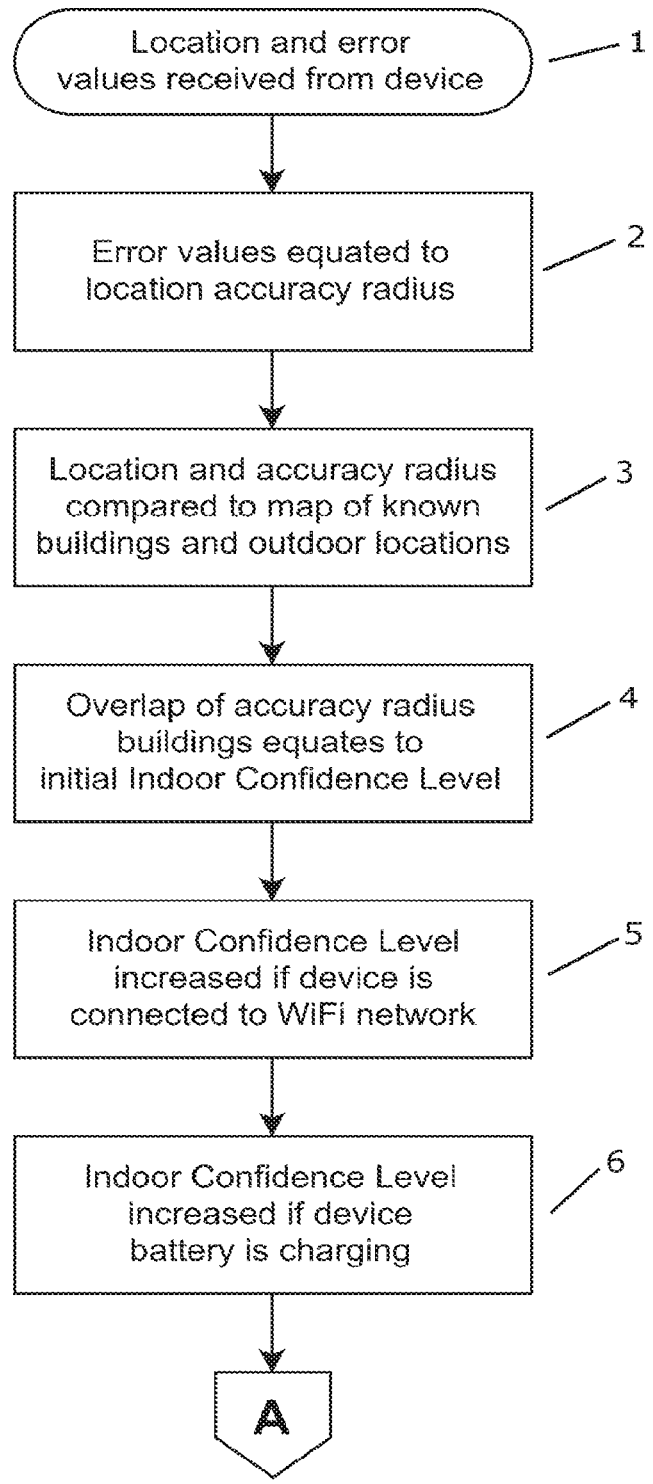

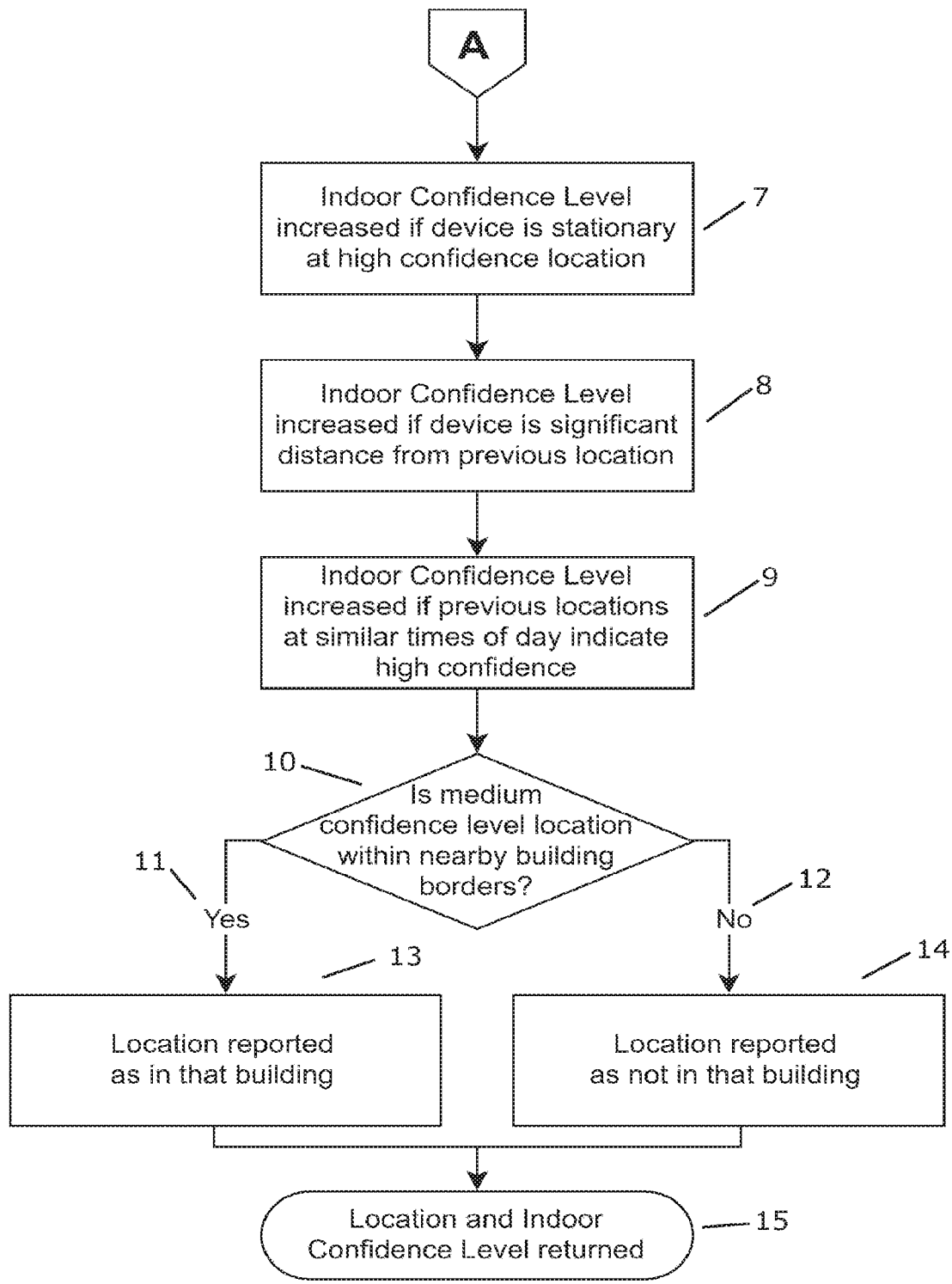

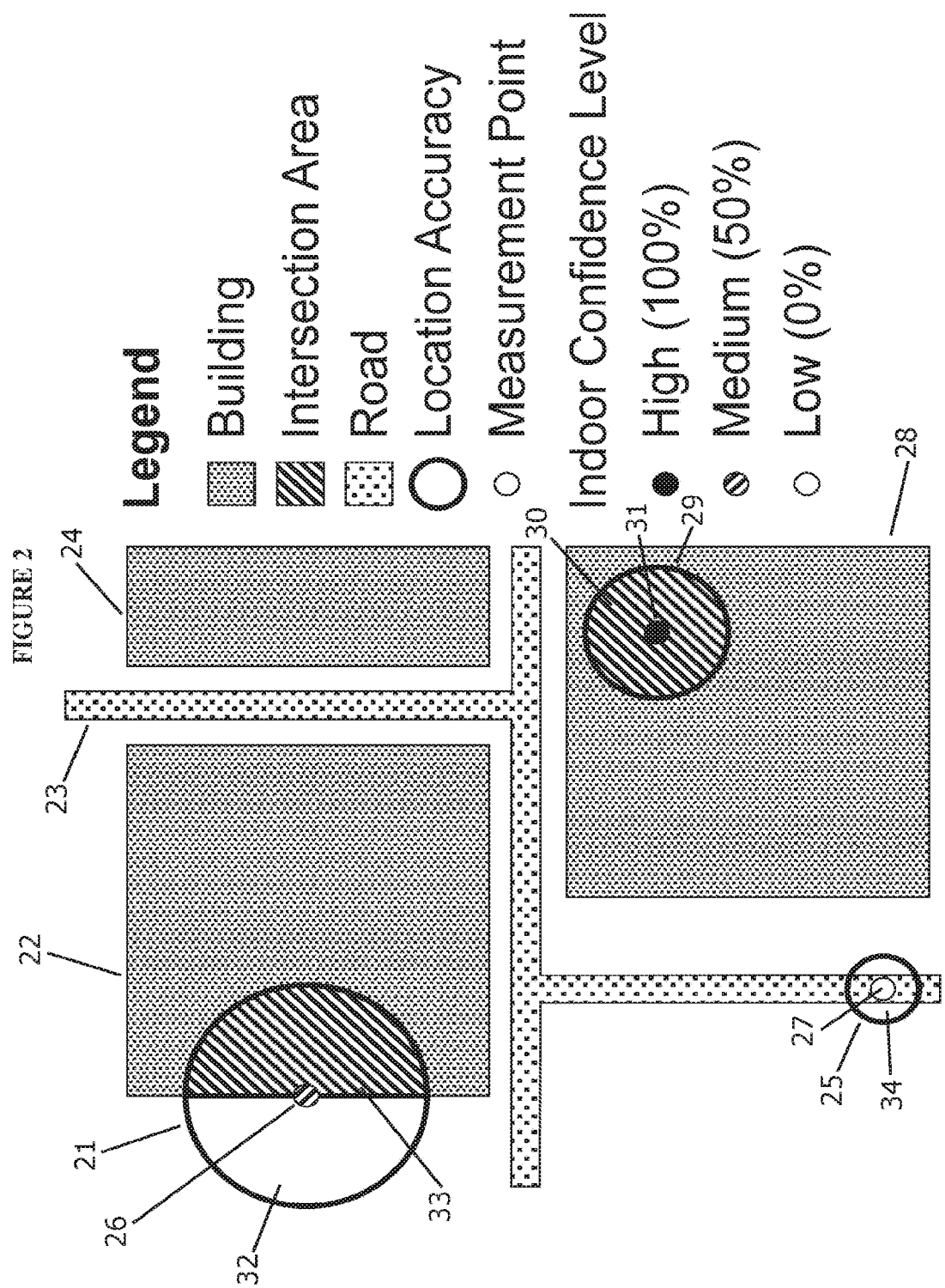

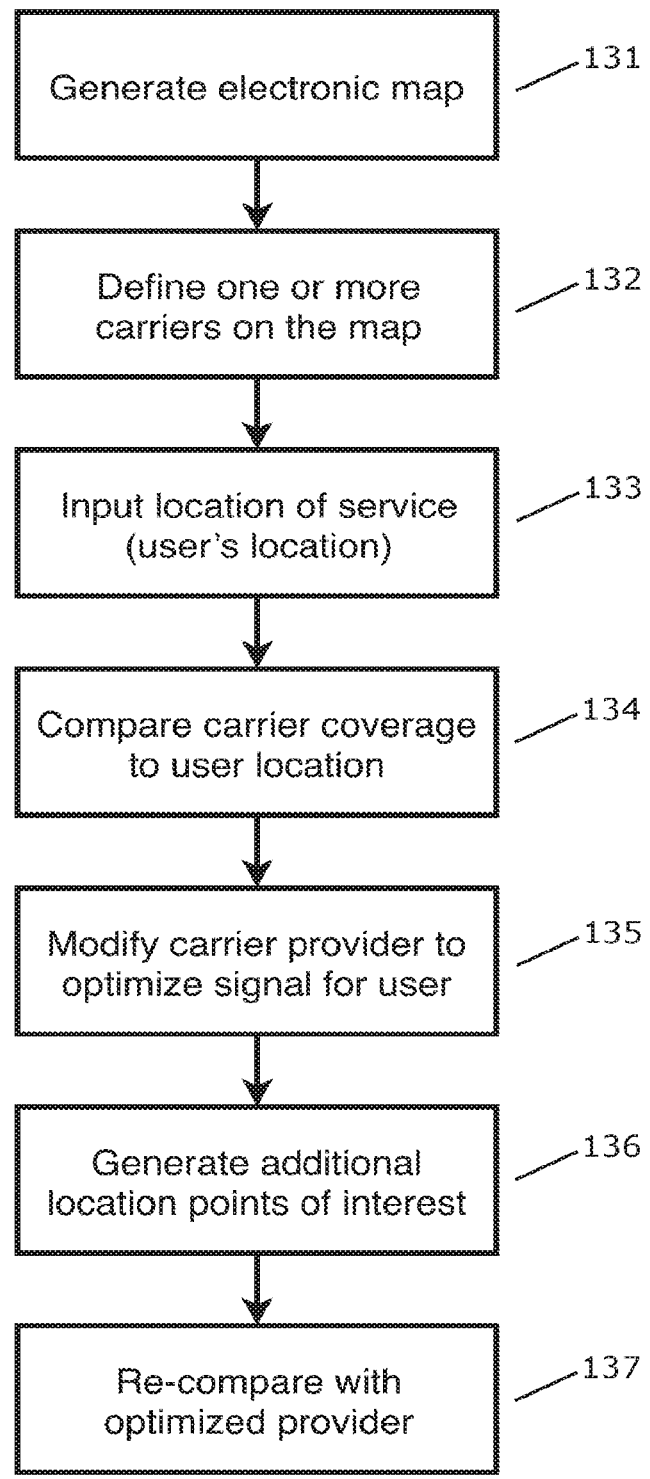

WIRELESS NETWORK SERVICE ASSESSMENT

CROSS-REFERENCE TO RELATED APPLICATIONS

This application claims the benefit of U.S. provisional application No. 62/761,924 filed on Apr. 11, 2018 with the US Patent and Trademark Office, the contents of which are incorporated herein by reference in their entirety.

BACKGROUND

Wireless performance and connectivity are modern issues and continue to expand as cellular and wireless connectivity and transmission of data has become ubiquitous. Not all network plans are the same and coverage, performance and connectivity for one provider is inherently different than coverage, performance, and connectivity for another provider based upon the location of towers and signal generators. While generally more coverage and stronger signals are better, efficiently providing coverage would generate improved performance at reduced costs to providers. This in turn can reduce costs to participants or allow for further extension of networks or improvements to other areas of the network. Accordingly, cellular network operators and others continually assess the coverage and performance of wireless networks to identify areas of potential improvement and to identify competitive position and potential opportunities to increase sales of wireless service in an area.

Coverage and performance of cellular networks or mobile networks can be measured using a variety of methods, such as using portable test equipment or gathering measurements directly from the network equipment that is providing wireless service. For example, portable testing equipment can be used to manually gather signal strength and noise measurements by movement along or within an area of interest. This can allow collection of such data generally within an area by persons walking, driving, or otherwise moving within an area. Furthermore, information can be combined with this collected data and measured directly from the network equipment. Together, these data points can assist with assessing performance of the network.

However, traditional methods of assessing network coverage and performance are limited in sample count, volume, and location accuracy. Our techniques improve the ability of interested parties to assess wireless network coverage, performance, and demand in larger areas and higher resolution than previously possible, and to prioritize areas of potential network improvement and sales opportunities.

SUMMARY

The embodiments described herein are directed toward methods and systems for improving network system performance for wireless networks, optimizing the same, determining indoor network performance, and methods for determining optimization priority of a network.

In a preferred embodiment, a method comprises capturing a measurement of network performance from a device application, network performance counter, or call trace that contains a reported horizontal and/or vertical location and one or more error values; defining wherein the one or more error values are a circular area with the radius equal to the location accuracy; using a computer mapping system wherein the reported horizontal and vertical location and error value is defined on a polygonal map defining existing structures and roads; and defining an indoor confidence level based upon the proportion of the area of the error value that falls within a structure as defined on the polygonal map.

In further embodiments, wherein the polygonal map is a 2-dimensional map.

In further embodiments, the polygonal map is a 3-dimensional map.

In further embodiments, the error value is a sphere, having a radius equal to the location accuracy.

In a further embodiment, an additional weight is applied to the indoor confidence level where the device is connected to a WiFi network. In a preferred embodiment, the device's location and location accuracy is measured from crowd-sourced data, network performance counters and/or call traces.

In a further embodiment, an additional weight is applied to the indoor confidence level if the device is charging.

In a further embodiment, an additional weight is applied to the indoor confidence level if the device is stationary for a predetermined amount of time. In preferred embodiments, the predetermined amount of time is at least 1 minute, at least 2 minutes, at least 5 minutes, at least 10 minutes, at least 15 minutes, at least 30 minutes, or at least 60 minutes.

In a further embodiment, an additional weight is applied to the indoor confidence level if a reported location change is too far from a previous reported location to have travelled in an elapsed time since the previous reported location.

In a further embodiment, an additional weight is applied to the indoor confidence level if a reported location change is too far from a previous reported location to have travelled in an elapsed time since the previous reported location.

In a further embodiment, if the indoor confidence level is calculated above a particular threshold (e.g. 40 or 50%) and wherein the error value overlaps within a predefined margin of a structure, then if an indoor confidence level is determined, the measurement is defined as being within said structure.

A further embodiment is directed toward an optimization priority, wherein an optimization score is defined for a given signal by comparing signal level (for example, RSRP (Reference Signal Receive Power)) to signal quality (for example, RS SNR (Reference Signal-to-Noise Ratio) or RSRQ (Reference Signal Receive Quality)). Signal level and signal quality can be detected for systems such as 2G, 3G, 4G, 5G, LTE, or systems of the like now or in development in the future. Additional signal and quality KPIs may also include RSSI, RxLev, Edo, SS-RSRP, SS-SINR, and others as known to those of ordinary skill in the art. Said KPI's may be interchanged with those referred to herein as understood by those of skill in the art.

In a preferred embodiment, signal level and quality are KPI (key performance indicators) which are typically correlated and can be quantified during the network planning phase, using signal propagation and modeling tools; post-launch optimization phase with RF measurements collection using a dedicated drive-test apparatus and manual processing and analysis of data logs; or Mature Network Optimization Phase, wherein network service measurements collection from a large number of existing customers and automatic processing and visualization are utilized.

In a preferred embodiment, an optimization score is defined by normalizing a deviation of a measurement's signal level and quality from (a) the area average signal level and quality and (b) the ideal signal level and quality achievable; and calculating a score using predefined quality value thresholds to generate an optimization score between 0 and 100.

A further embodiment comprises calculating a score for optimization priority of a signal measurement within a measurement set wherein one of four scenarios exist namely: wherein (1) the slope of RS $SNR_{[AVERAGE]}$ is lower than the slope of RS $SNR_{[IDEAL]}$ and lower than the actual RS SNR; (2) the slope of RS $SNR_{[AVERAGE]}$ is lower than the slope of RS $SNR_{[IDEAL]}$ and higher than the actual RS SNR; (3) the slope of RS $SNR_{[AVERAGE]}$ is higher than the slope of RS $SNR_{[IDEAL]}$ and lower than the actual RS SNR; (4) the slope of RS $SNR_{[AVERAGE]}$ is higher than the slope of RS $SNR_{[IDEAL]}$ and higher than the actual RS SNR. These scenarios can be optimized by calculating the priority score according to the formulae defined herein, in order to generate an optimization priority for a single measurement within a dataset.

A further embodiment comprises a method of creating an indoor confidence level comprising: receiving a location and location accuracy value from or for a device, wherein the location accuracy value is equated to a location accuracy circle; comparing the location and location accuracy circle to a map of known buildings and outdoor locations; and defining an indoor confidence level based upon the percent of overlap of the accuracy radius to a building on said map.

In a further embodiment of the method of creating an indoor confidence level, wherein a map of known building footprints is an electronically defined map comprising a plurality of polygons, each polygon defining a known building or structure, which are each defined as being indoors, and wherein all other space on said map is defined as outdoors.

In a further embodiment of the method of creating an indoor confidence level, wherein the indoor confidence level defined upon the percent of overlap of the accuracy radius to a building on said map is an initial indoor confidence level.

In a further embodiment of the method of creating an indoor confidence level, wherein the initial indoor confidence level is modified based upon one or more additional steps, selected from the group consisting of: detecting whether a device is connected to a WiFi network; detecting whether the device battery is charging, detecting if the device is stationary at a high confidence location, detecting whether the device moves a significant distance in a period of time "T" that provides indication of unreliable location mapping; detecting a location and comparing to a similar time and location from a previous day; and combinations thereof.

In a further embodiment of the method of creating an indoor confidence level, wherein the process of detecting whether a device is connected to a WiFi network is further defined by comparing the strength of the WiFi signal to a signal threshold variable in order to determine whether a device is connected to a WiFi network.

In a further embodiment of the method of creating an indoor confidence level, wherein the process of detecting whether the device battery is charging detects whether the device is connected to A/C power.

In a further embodiment of the method of creating an indoor confidence level, wherein the process of detecting if the device is stationary at a high confidence location comprises detecting if a device is stationary for a time period "T" and wherein the high confidence location is one that has an indoor confidence level of at least 50, or which has previously been categorized as being indoors.

In a further embodiment of the method of creating an indoor confidence level, wherein the process of detecting whether the device moves a significant distance in a period of time "T" is defined as capturing a set of location datapoints and comparing a set of location datapoints over a time period $T_1$, and wherein if any data point moves a distance greater than possible during the period of time "T" then that distance is identified as being unreliable.

In a further embodiment of the method of creating an indoor confidence level, wherein the distance being unreliable provides an increase in the indoor confidence level.

In a further embodiment of the method of creating an indoor confidence level, wherein the process captures data at a first time and stores a location and a time in a database, and wherein a data point, captured at a different day, at the same time of day, is compared to the location of the first time, and wherein if the location is the about the same, then the indoor confidence level is increased.

In a further embodiment of the method of creating an indoor confidence level, wherein the indoor confidence level is modified due to any of the additional steps, the indoor confidence level is a medium confidence level.

In a further embodiment of the method of creating an indoor confidence level, wherein the medium confidence level being defined, and wherein the location accuracy radius overlaps with any building, the location is reported as in that building.

In a further embodiment of the method of creating an indoor confidence level, wherein the medium confidence level being defined, and wherein the location accuracy radius does not overlap with a building, the location is reported as not within in that building.

A method for identifying an optimization priority for a given measurement within a dataset of wireless measurements comprising: calculating a score for optimization priority of a signal measurement within a measurement set wherein one of four scenarios exist namely: wherein (1) the slope of RS $SNR_{[AVERAGE]}$ is lower than the slope of RS $SNR_{[IDEAL]}$ and lower than the actual RS SNR; (2) the slope of RS $SNR_{[AVERAGE]}$ is lower than the slope of RS $SNR_{[IDEAL]}$ and higher than the actual RS SNR; (3) the slope of RS $SNR_{[AVERAGE]}$ is higher than the slope of RS $SNR_{[IDEAL]}$ and lower than the actual RS SNR; (4) the slope of RS $SNR_{[AVERAGE]}$ is higher than the slope of RS $SNR_{[IDEAL]}$ and higher than the actual RS SNR.

In a further embodiment of the method for identifying an optimization priority, wherein the measurement comprises calculating: The formula is defined for Priority (%) is defined by claim 15.

In a further embodiment of the method for identifying an optimization priority, wherein the measurement comprises calculating: The formula for Priority (%) is defined by claim 16.

In a further embodiment of the method for identifying an optimization priority, wherein the measurement comprises calculating: The formula for Priority (%) is defined by claim 17.

In a further embodiment of the method for identifying an optimization priority, wherein the measurement comprises calculating: The formula for Priority (%) is defined by claim 18.

In a further embodiment of the method for identifying an optimization priority, further comprising calculating an indoor confidence level according to claim 1, and wherein a measurement for defining the optimization priority further comprises an indoor confidence level and a location.

In a further embodiment, a method of defining an optimization parameter for wireless network solutions comprising, defining a result, wherein the result is offered in the form of a calculated score ranging from 0% to 100% which represents the normalized deviation of a measurement's signal level and quality from a) a calculation of the area average signal level and quality and b) a calculation of the ideal signal level and quality achievable; wherein the calculated score also uses predefined signal quality value thresholds to place higher priority for optimization on areas with considerably degraded quality; and wherein areas with a high calculated score value and a high signal and poor quality, a performance modification selected from network changes such as antenna configuration or handoff settings adjustments, rather than the installation of a new cell site.

In a further embodiment, a method of optimizing a network carrier for a user comprising: defining at least one location point having a location coordinate (latitude and longitude), defining the location point on a map comprising known structures, said structures defined as polygons on said map, overlying a map of carrier coverage to said map and defining a coverage rate for said location point. In a further embodiment, the method comprising defining at least two location points on a map. In a further embodiment, the method comprising applying at least two different carrier overlays to define an optimized carrier for the location point or location points.

Each of the above embodiments can be combined with one or more of additional elements or exclude an element from one description in order to facilitate the calculation of an ICL or of generating an optimization priority as defined and explained herein.

BRIEF DESCRIPTION OF THE DRAWINGS

FIGS. 1A and 1B provide a flowchart of a process for improving network service assessment through generation of an indoor confidence level.

FIG. 2 details an example map of structures (buildings) and outdoor spaces for charting inside or outside performance metrics.

FIG. 10 depicts a flowchart showing a method of use of systems described herein to evaluate network service and for identifying networks having better or worse service for an individual user.

DETAILED DESCRIPTION OF THE INVENTION

Figure 3:
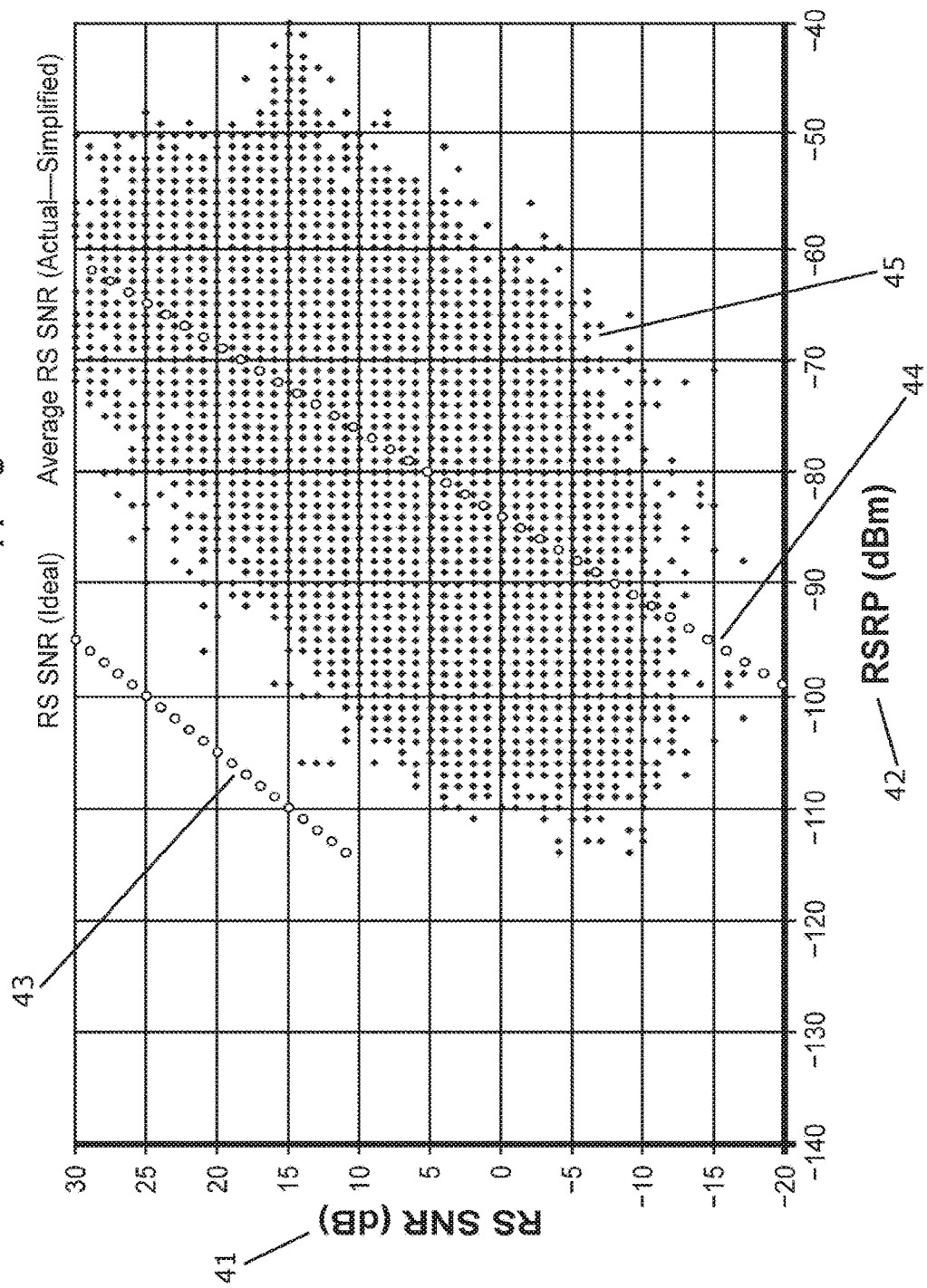
FIG. 3 details correlation mapping of RS SNR as compared to Average RS SNR, when plotted against the signal to noise ratio in the y-axis and the signal level in the x-axis.

For decades, wireless network coverage and performance has been assessed though one-time or periodic collection of measurement samples using professional test equipment. Measurements may include signal level, signal quality, dropped calls, and data transfer speeds. The test equipment is typically installed in a vehicle which is driven on roads or placed in a backpack or cart which is walked through an outdoor or indoor area under study. Location information may be gathered through a GPS (or similar) device connected to the test set, or the location may be manually recorded periodically by the tester. After collection, the samples are processed, displayed, and analyzed on a map to identify any service problems and their geographic location. For example, a sample data set comprising a plurality of data points 45 are depicted in FIG. 3, which are collected in this manual manner.

Measurement sample collection using professional test equipment that is driven or walked through an area can be very costly. Additionally, professional test equipment is limited to a small number of test devices, fragile cables, and connectors that are prone to breakage, and is limited to locations that are accessible to the tester. For example, coverage samples taken from a vehicle may not accurately reflect the actual coverage at locations adjacent to the roadway, or do not accurately reflect the coverage at an elevated height, i.e. inside of a building that is adjacent to that street. Certainly, these may not address coverage underground, such as in subway or trolley spaces, if these are not specifically tested. This leads to weaknesses in the data, lowering its value, despite the high costs of collection.

Another common network service assessment technique involves analysis of measurement samples gathered continuously by the wireless network equipment itself. To locate where problems are occurring geographically with this method, delay measurements from serving and neighboring cell sites may be combined to yield an approximate location of any service problems. Since samples collected directly by a network may be located geographically based on low resolution delay measurements, this often results in poor location accuracy. Additionally, with this method, samples are only available for the host network and not competing networks.

These collection strategies and data points can be further combined together to generate a more robust classification system, but such system is an expensive functionality of two collection methods and neither system nor the combination of collection systems remedies all of the deficiencies regarding such collection methods.

The recent proliferation of smartphones creates another source of measurement samples: applications running in the background or foreground on handheld devices. These devices include a variety of sensors to determine location, including satellite-based systems such as GPS, barometric pressure sensors, and connectivity to the operating system manufacturer's proprietary system for determining the location based on nearby WiFi access points. These devices are often located in places difficult to access with professional test equipment, such as homes and offices. However, the accuracy of a reported location may vary dramatically depending on obstructions in the line of sight to GPS satellites, availability of reference WiFi networks, and other factors.

As networks mature and more network infrastructure is deployed, wireless users are becoming increasingly satisfied with outdoor and in-vehicle service, but they remain unsatisfied with indoor network performance due to building penetration losses suffered during signal reception and transmission. Because of the above limitations, it is difficult for wireless network operators and others to continually assess network coverage and performance at a low cost and high location accuracy in a wide area, especially in buildings.

Accordingly, new techniques are necessary to assess network coverage and performance. Herein are described techniques to overcome existing limitations by identifying which coverage and performance measurement samples are likely indoors or outdoors, attributing the likely indoor samples to particular buildings, aggregating one or more measurement samples to assess network coverage, performance, user density, and data usage per building or outdoor area, and prioritizing areas of potential network service improvement and sales opportunity. Measurement samples may be gathered through applications typically installed on smartphones or gathered directly from wireless networks. Results can be displayed on a map and in tabular form.

One technique is to calculate an Indoor Confidence Level (ICL) for each sample or group of samples. The ICL indicates the likelihood that the sample was generated indoors. Once ICL has been calculated, the samples with high ICL may be filtered and aggregated to yield the overall (mean, median, etc.) performance in matched buildings or outdoor areas.

Indoor Confidence Level

Consumers remain disappointed with service coverage within buildings. Accordingly, it is of interest to wireless network operators, network infrastructure owners and operators, building owners, market research firms, and others to assess network performance, user behavior, and areas of potential improvement in indoor and outdoor areas. Today, measurements of network quality and user behavior may be gathered in the background or foreground of various device applications, such as smartphone games and other applications, or directly from network infrastructure performance counters and call traces. A measurement sample typically includes a location along with an error value. However, there is no reliable indication whether the sample was generated indoors or outdoors. Additionally, if there are multiple buildings in the area, there is no indication which building the sample was recorded in.

Our techniques overcome these limitations by assigning an Indoor Confidence Level to each sample or group of samples. Depending on the use case, a threshold may be used to select only samples with high or low Indoor Confidence Level. Additionally, the samples are attributed to particular buildings. For example, by using data points that are only high ICL, overall coverage, performance, and user density can be assessed for particular buildings or sections of buildings.

The methods below describe a method for determining the likelihood that a device or network-generated measurement sample was generated indoors, and attributes them to a specific building or outdoor area.

FIGS. 1A and 1B provides an overview of the ICL methodology, and FIG. 2 details an example of certain data points on a sample map. Beginning with FIG. 1A a flowchart decision tree depicts a process for evaluating ICL. Step 1 of FIG. 1A comprises receiving location and error values from a device. Together the location and error values define a measurement sample 1, which is received from a device or network performance counter or call trace that contains a reported horizontal and/or vertical location as well as one or more location accuracy values. Horizontal location accuracy is typically defined as the radius 2 of a circle centered at the reported latitude and longitude coordinates. This imaginary circle indicates that there is a high probability of the true location being within its bounds. The area overlap ratio between the horizontal location accuracy circle and polygons defining horizontal footprints of known structures (buildings) is used to calculate an initial indoor confidence level 4.

Accordingly, using the area of a circle, for example for two datapoints, one with 25% of the area within a polygon means a 25 ICL, and one with 75% of the area within a polygon means a 75 ICL. This level can then be modified based on additional factors. For example:

If the device is connected to a WiFi network, an additional weight is applied to the Indoor Confidence Level 5.

If the device's battery is charging, an additional weight is applied to the Indoor Confidence Level 6.

As depicted in FIG. 1B, if the device has been stationary for a period of time in a location with a high initial Indoor Confidence Level, an additional weight is applied to the Indoor Confidence Level 7.

If the recent reported location is far from the previously reported location for the device to have traveled in the elapsed time, an additional weight is applied to the Indoor Confidence Level 8.

If the reported location of previous measurements at similar times of day indicates a high Indoor Confidence Level, an additional weight is applied to the Indoor Confidence Level 9.

In certain embodiments, if the calculated Confidence Level (meaning the initial ICL and the above steps 5-9 are completed to generate a calculated Confidence Level) is above a particular threshold (40% or 50% for example) and within a pre-defined margin from a nearby building, then that building is identified as the one the reported measurement was recorded within 10. These steps are examined in greater detail below.

These steps can be visualized in view of FIG. 2, wherein the horizontal location accuracy values are depicted as circular representations, with the horizontal location accuracy value being defined as the magnitude of the depicted radius. For example, in FIG. 2, there are three different measurement points 26, 27, and 31, each having different accuracy values, and thus the radius of each of 21, 25, and 29 are different, a smaller radius defining a higher location accuracy. Thus, the location accuracy value for the first radius 21 at the first point 26 is much larger than the location accuracy value of the second radius 25 at the second point 27, and the location accuracy value for the third radius 29 at the third point 31 has a location accuracy between the first radius 21 and the second radius 25. These locations are then mapped against the Structures 22, 24, and 28. The words "structures" and "buildings" are used interchangeably herein. Thus, a location point can be determined as an initial threshold based on these known points and measurements.

Thus, the overlap radius of each of the first radius 21, the second radius 25, and the third radius 29 are overlapped on the polygonal map to generate an initial indoor confidence level 4. It is important to define this indoor confidence level, as optimization of the network may vary depending on indoor or outdoor performance.

Therefore, for a given data point, an indoor confidence level is determined to be on a continuum between 0% and 100%, with 0% defining that there is no indoor confidence, i.e. the data point is likely outdoors. By contrast a score of 100% defines that the data point is likely indoors. The points in between define the continuum wherein there is not a binary response, but a level of certainty with regard to the position of a device when taking a measurement. Indeed, FIG. 2 defines some examples of these confidence levels, with the first data point 26 having a 50% of the area of the circle indoors and 50% outdoors, and thus defines an indoor confidence level of 50. A second data point 27 having 0% of area overlap with any building polygon indicates 0% indoor initial confidence level, and third data point 31 having a 100% of the area inside a building polygon, defining a 100% initial indoor confidence level.

Determining and refining the initial indoor confidence level for the first data point 26 is a key feature that is addressed by the methods defined herein. Once the horizontal location accuracy values are defined and the radius 21 plotted against the polygonal map, in this case, depicting one half of the radius 21 within 33 the structure 22, and one half outside 32 of the structure 22, an initial ICL of 50% is calculated. Improvement of this level can be made through additional steps.

Thus, as defined in FIG. 2A a further step to refining the initial indoor confidence level is to ask whether the data point 26 was collected when the device (any device, whether it is a device having cellular telemetry [phone, tablet, laptop, watch, etc.], a network performance counter, or call trace) is also connected to a WiFi network 5. This is a relevant data point as many devices are not connected to WiFi when traveling on a road or walking through a neighborhood, and these individuals typically use cellular data for connections. Thus, a person using a smart phone and out for a run listens to music through a streaming service by using cellular data. When the device does connect to WiFi 5 it usually means that the device is now in a location that is ordinarily an indoor location, such as a home, office, gym, or other space where a WiFi network that is recognized by the device is expected. Thus, a strong active or passive WiFi connection indicates a higher confidence level of the device being indoors at that moment.

Where no WiFi network is detected, further steps may be evaluated to determine an indoor confidence level. In certain embodiments, the lack of a WiFi network can be utilized to reduce the indoor confidence level. Whether a decrease in the indoor confidence level is provided or no change is provided, further steps can be utilized to further modify the indoor confidence level.

When placed indoors, devices are frequently connected to a charger in order to maximize battery life of the device. While it is possible to do this in an outdoor setting, i.e. with an extended battery or power pack, the presence or absence of charging is indicative of the location of the device. Furthermore, many of the battery pack devices are capable of detecting the differences between a connection to an AC charger or another type of mobile charging. Accordingly, an increase in the indoor confidence level adjustment is generated if the device is charging. In preferred embodiments, an increase of the ICL is defined only when the charge is defined as coming from AC power. Thus, supplemental battery packs or mobile charging would not generate an increase in the ICL based on this criterion.

Again, the absence of charging needs not reduce the indoor confidence level in all circumstances, as it is common to also have a device not charging if the device is in use, or simply because there is no access at the device's present location to charge.

The indoor confidence level can again be increased if a device is stationary at a high confidence location 7. A high confidence location is one that has an ICL of at least 50%, or which has previously been categorized as being indoors based on additional data. For example, data point 26 would have its indoor confidence level increased if the device remains stationary for a given amount of time. That would indicate that the device may be within the building, for example, at a desk, in a locker, or on a person as they are working within a building. It is more likely that a device is indoors when stationary as compared to outdoors and because of the propensity for the device to be with a person who is required to be working at that location.

Many devices have GPS tracking or other triangulation positional tracking systems. However, these tracking systems have somewhat limited accuracy and are prone to wide positional deviations from time to time. For example, a device in a static location may measure its location every "n" seconds, with "n" being usually between 1 and 60 seconds. Of these measurements, only a subset might have nearly identical locations, with the rest reporting high variance in locations. If the distance between the nearly identical locations and the remaining ones is higher than the user could have travelled in the short period of time, then there is a high likelihood that the device is not actually moving but is instead experiencing location accuracy issues due to a poor GPS lock or network-assisted location triangulation. Accordingly, the indoor confidence level is increased where the distance is significantly different than from a previous location 8, because there is a higher probability that the device is static at a location that is not using GPS, as indoor applications have a lower use of GPS and higher use of triangulation protocols, and these triangulation protocols are more prone to deviations in position than their GPS counterparts, specifically when inside of a building.

Accordingly, as defined in FIG. 1A, steps 1-4 define an initial ICL and the remaining steps seek to increase the certainty of the ICL calculation, whether that is lower or higher. Accordingly, in addition to the mapping on the polygonal map and determining error values for a particular location, the additional qualification steps in steps 5-9 of FIGS. 1A and 1B are further defined below. These steps may be used alone or in combination with one another.

After defining an initial ICL, based upon mapping then one or more of the following steps can be utilized to evaluate confidence in the ICL determination: connection to WiFi 5, battery charging 6, stationary device 7, distance traveled from a prior position 8, and location of device at a similar time and place from a prior recorded location 9. Each of these factors provides information relevant to the position of a device, and whether it is inside of a building.

Furthermore, prior data based on location and timing can also be utilized to modify the ICL. For example, historical data showing a measurement at a similar time and place 9 during several weeks of data would be highly suggestive of an indoor location, i.e. the place of employment of the individual. However, a different location at a time and place than normally reported indicates the possibility of being at a different indoor location or an outdoor location, thus reducing the ICL.

Accordingly, as in Step 7, we can define a high confidence location through step 9, which compares the previous location at a similar time of day. In a preferred embodiment, the location and time are stored within a database or in memory, which allows for a comparison from a time point "to" to a present time, for comparison to attain the high confidence location determination. For example, places where the phone typically stays are at home, school, or work, and these can be tracked through simply recurring habits based on time and location to generate such high confidence locations. Accordingly, as in step 10, below, we can also attribute a high confidence location to a building, just as below a medium confidence is attributed to a building. Thus, any time a high confidence is set, and the measurement error is within a building polygon, we set the location as in that building, just as in steps 10, 11, and 13 with medium confidence listed below. If there is no building nearby, then that indicates a likelihood that there is not a high confidence to begin with and that the previous time and location may be outdoors, such as someone who runs at the same time every day.

Therefore, taking one or more of the above steps into consideration, a medium confidence level can be calculated. The system is queried in step 10: Is medium confidence level location within nearby building borders? By this, we mean that "medium confidence" refers to an analysis of steps 5-9 of FIGS. 1A and 1B. Medium confidence itself can be a variable and designated based upon the criteria of the search. For example, wherein medium confidence is defined as meeting at least one of the evaluation steps. Namely, if in step 5, there was a WiFi connection, or in step 6, charging, or step 7 stationary device, or step 8 the distance travelled, or step 9 a similar location. Each of these allows for increasing the confidence, and thus any positive responses to such evaluations steps would result in medium confidence. However, because medium confidence is intended to be a variable, medium confidence may require a positive assertion to two or more of the steps 5-9, or three or more, or even four or more, or all five. Preferably, two or more steps are utilized to generate a medium confidence. Accordingly, if medium confidence is defined, and within nearby building borders, then the answer is "Yes" 12, then the location is reported as being within the building 14. If the answer is "No" 13, either because of a failure of medium confidence or of being within nearby building borders, then the location is reported as not within the building 15. Thus, depending on the answer, a location and indoor confidence level is returned 16 and can be stored in a database or utilized for further analysis. Thus, step 15 confirms both a determination of inside or outside of a building and the confidence level returned of that determination.

In other embodiments, confidence level is additive of the initial confidence level. Namely, an initial score is generated by mapping and then an increase or decrease in the score is generated. For example, for each positive assertion to steps 5-9, ten points can be added to the initial ICL. In other embodiments, twenty-five points can be added to the initial ICL. In other embodiments fifty points can be added to the initial ICL. Accordingly, users can modify the scoring based upon particular certainty with regard to the data to fit their needs. Furthermore, a positive assertion to steps 5-9 may increase the initial ICL, but a negative response may also decrease the initial ICL by an amount. Each step may also have different weights than another step.

For example, where a plurality of these indoor confidence level scores is generated, a map can be created of signal to noise ratios and signal strength using only measurements with high or low ICL to allow for improved data management of signal quality in a particular area. A high ICL may be greater than 50, 60, 70, 80, or 90, and a low ICL may be below 50, 40, 30, 20, 10, or any number in-between for either the high or low ICL. We can use this information alone or in conjunction with historical or legacy data to generate improved signal quality. This information can then be utilized, on one hand, by service providers who can evaluate weaknesses in their signal reach or quality to specifically improve the infrastructure, instead of deploying additional equipment to increase the signal level in the impacted area. Those in the industry will recognize that the data herein can be mined to allow for optimization rather than capacity expansion.

Furthermore, this information can be utilized within a series of publications, whether online or hard copy, to generate thematic maps regarding signal quality. One particular embodiment utilizes a geographic map, similar to that of FIG. 2, wherein a user can input their location into an electronic database. FIG. 10 depicts a flowchart showing this process comprising defining an electronic map 131, defining one or more carriers on the map 132, defining a location or inputting a location of a user 133 on said map, comparing the defined location of the user 133 with the carrier coverage 134, and changing the coverage to different providers 135 to optimize the carrier coverage. This last step can be performed automatically by the system; for example, the defined coverage 132 may be an input to a current carrier of the user, and, once the user defines her location 133, the system can automatically select an optimized carrier 135 to be displayed on the map. It may be that several carriers have excellent signal in the particular location, so it may be advantageous to generate two or more location points 136 for the user and then re-comparing or re-calculating an optimized provider 137. These steps can be repeated as necessary with "N" number of location points in order to define an optimized carrier. For example, points might be home, school, job, friend's home, etc., and a user can then optimize the carrier coverage based upon these points. Obviously, the data can then be mined by the providers to identify possible targets for sales or for areas that have the most desire and can be optimized by a carrier.

This can be used by both the user and by carrier providers, as the user can find optimal service for the best price, and the providers can identify weaknesses in their service to be improved. Furthermore, providers can identify areas of strength against their competition and focus advertising to these areas to capture additional sales.

FIGS. 9A, 9B, 9C, and 9D provide a detailed flowchart for calculating of elements of Indoor Confidence Level, and details setting of certain levels of confidence as the process and assertion steps are completed.

Figure 9A:
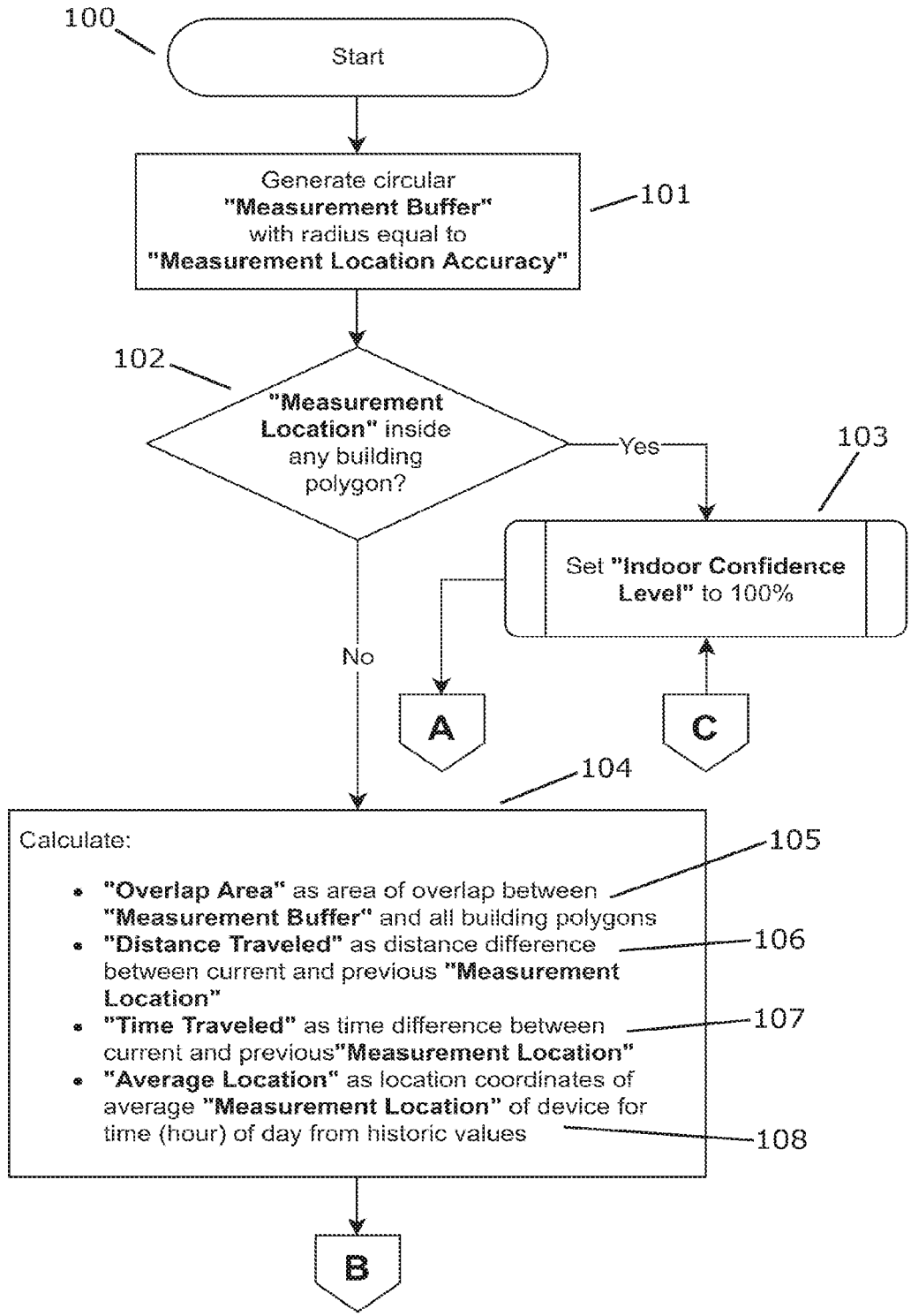
FIGS. 9A-9D depict a flowchart showing a detail of calculating an indoor confidence level.
Figure 9B:
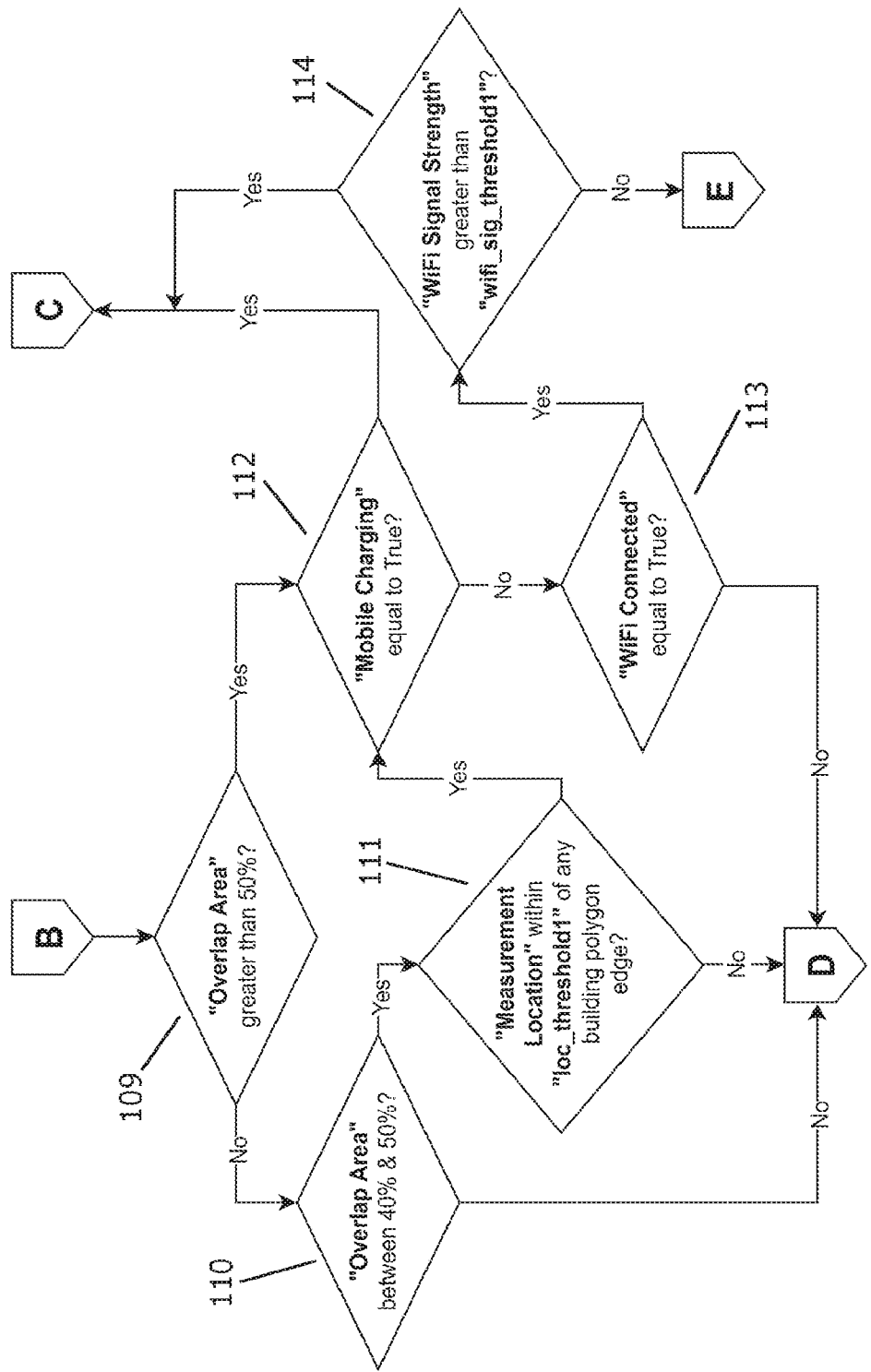
Figure 9C:
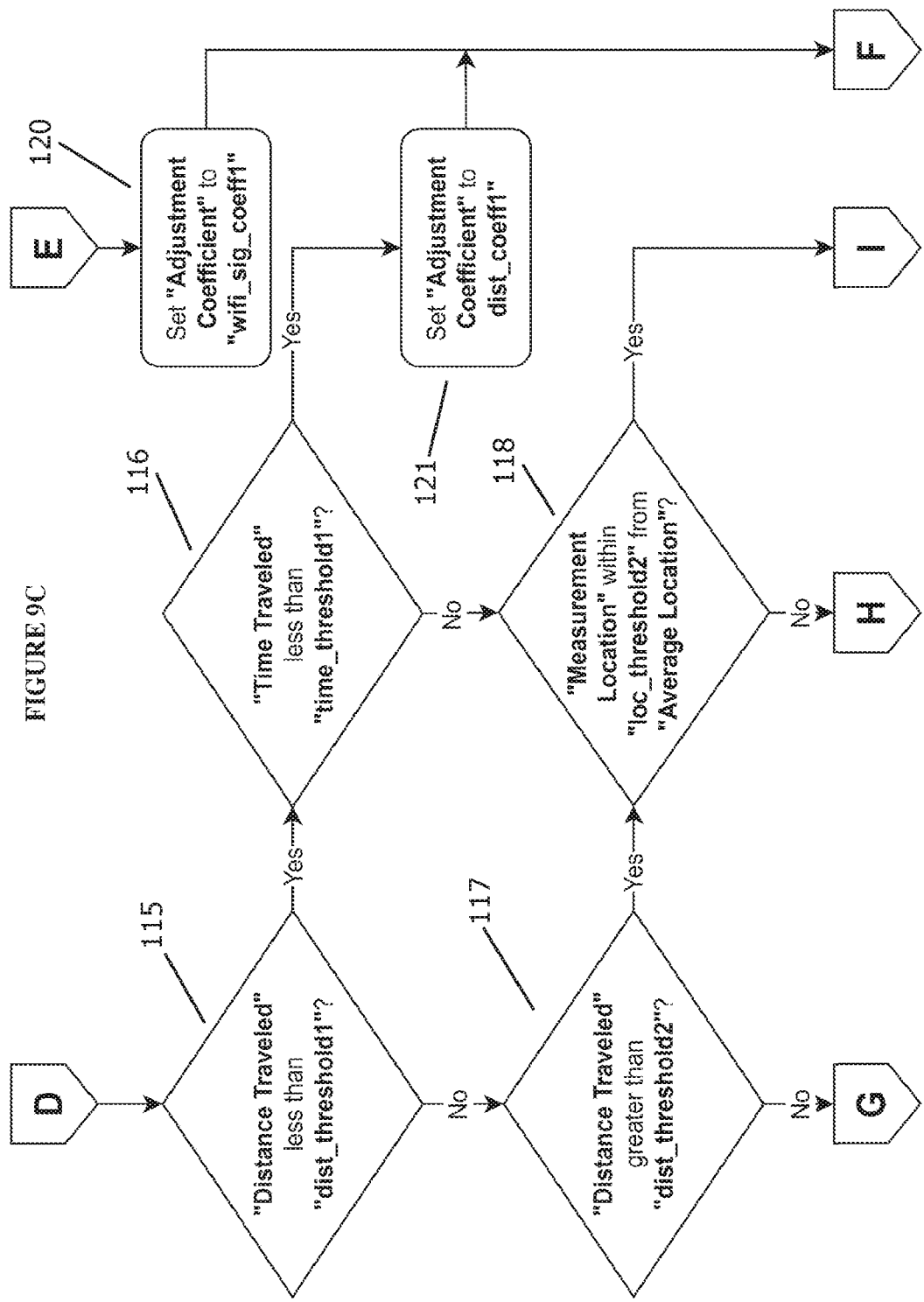
Figure 9D:
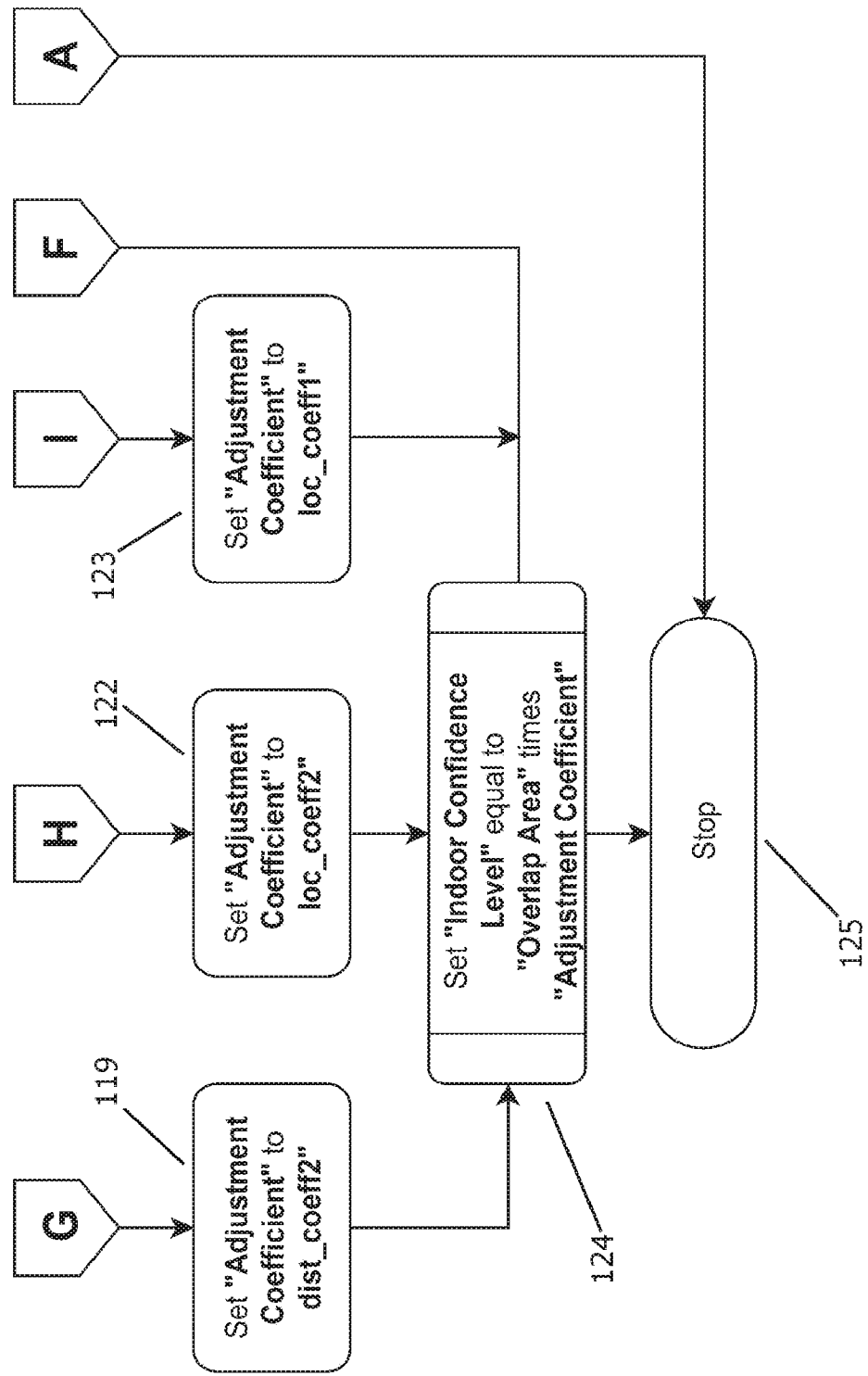

In view of FIG. 9A, starting the process at 100, we take a data point and generate a circular "measurement buffer" with a radius equal to the "measurement location accuracy" 101. An initial threshold question is whether this "measurement location" is inside any building polygon 102. If yes, we set the indoor confidence level to 100% 103. If no, we continue with additional calculations 104.

A further step is to calculate an overlap area 105 as overlap between a measurement buffer and all building polygons. Second, we calculate distance traveled as a distance difference between current and previous measurement location 106. Next, we measure the time traveled as a time difference between current and previous measurement location 107. Finally, we take the average location as the location coordinates of average measurement location of the device for the time (hour) of day from historic values for the same device 108.

Each of these steps above provides value to measure the confidence of whether a data point is generated inside or outside of a building. Considering the overlap area, the next step is determination of whether this overlap area is greater than 50% 109. If yes, then the next step is to determine whether the device is mobile charging 112. If yes, then indoor confidence level is set to 100% 103, then the measurement location is defined as within a "location threshold 1" of any building polygon edge. However, if the overlap area is less than 50%, then we consider whether the overlap area is between 40% and 50% 110. If yes, then the measurement location is defined as within a "location threshold 1" of any building polygon edge. The status of mobile charging 112 is then considered.

However, if the mobile charging 112 is no, then the process asks whether there is a WiFi connection 113, wherein no WiFi continues to point D, and yes asks whether WiFi Signal strength is greater than a WiFi signal threshold 114, in which yes sets indoor confidence level to 100% 103, and no leads to E.

Following path D, if the distance traveled is less than the "distance threshold 1" 115 then the system asks whether the time traveled is less than the "time threshold 1" 116. Where the distance traveled is not less than the distance threshold from 115, then the system asks whether the distance traveled is greater than the "distance threshold 2" in 117. If yes, then we ask if the measurement location is within the "location threshold 2" from the average location 118. If the time travelled is less than "time threshold 1" 116 then we set adjustment coefficient to "distance coefficient 1" 121: if the time is not less, then we proceed to determine whether the measurement location is within the location threshold 2 from the average location (118). If yes, then we set adjustment coefficient to location coefficient 1 (123). If no, then we set adjustment coefficient to location coefficient 2 (122). Finally, we set the indoor confidence level equal to the overlap area times the adjustment coefficient 124 which was set in the previous steps (119, 120, 121, 122, 123) leading to the aforementioned product. This takes us to the end of the algorithm decision tree 125.

In each of these cases, the adjustment coefficient can be set by the particular stringent requirements of the process at hand. Accordingly, in one embodiment, the value may be X and, in another embodiment, the value Y. Furthermore, the coefficients do not need to be identical, and certain coefficients may hold more weight than others.

Therefore, preferred embodiments define a method of defining an indoor confidence level through a process including steps of: (1) receiving location and error values from a device, wherein error values are equated to location accuracy results; (2) comparing the location and accuracy radius to a map of known buildings and outdoor locations, (3) overapplying the accuracy radius with buildings to generate an initial indoor confidence level. In certain embodiments, these steps are sufficient for generating an indoor confidence level.

In additional embodiments, it is necessary to include at least one or more steps, selected from the group consisting of: detecting whether a device is connected to a WiFi network; detecting whether the device battery is charging, detecting if the device is stationary at a high confidence location, detecting whether the device moves a significant distance in a period of time "T" that provides indication of unreliable location mapping; detecting a location and comparing to a similar time and location from a previous day; and combinations thereof.

In further embodiments, using any one of the above steps generates a medium confidence score that then detects whether the data is within nearby building borders and then determining from this point whether the location is indoors or outdoors and returning a location and indoor confidence level.

In further embodiments, once a high confidence location is determined, a location and indoor confidence level can be returned that reports that the location is within a building. For example, where the location accuracy radius is within a building polygon and a high confidence location, then the location is reported as within that building.

Where a high or medium confidence level is determined and a location accuracy radius touches two or more building polygons, the building location is determined to be the building polygon with the greatest percentage within the location accuracy radius.

Optimization Priority Level

Calculation of the Indoor Confidence Level has several benefits that are not currently utilized by users or carriers. However, additional data can be mined and utilized alone or in combination with the indoor confidence level. An Optimization Priority Level (OPL) may be calculated for each sample or group of samples. The OPL indicates the potential for coverage or performance improvement through network optimization changes such as cell site antenna configuration changes or handover settings adjustments. OPL from multiple samples may also be filtered and aggregated to yield the overall (mean, median, etc.) need for improvement through network optimization changes.

Once ICL or OPL values are calculated, several individual raw measurements in the same general location or building can be aggregated to assess the overall service in each building or outdoor area. The ICL and/or OPL values may then be combined with each other or with other inputs such as the percentage of measurements on low bands compared to high bands, density of users, proportion of users on legacy vs. newer technologies (LTE vs. UMTS, for example), and others to rank buildings and outdoor areas for network improvement and sales opportunity.

Optimization Priority

An important task faced by wireless network operators is improvement of network signal level (for example, LTE RSRP [Reference Signal Receive Power]) with little to no cost to signal quality (LTE RS SNR [Reference Signal Signal-to-Noise Ratio], for example). These are two of several different Key Performance Indicators (KPIs), and which these KPI's typically follow an inverse relationship. Currently this can be accomplished during:

Network Planning Phase: Using signal propagation and modeling tools;

Post-launch Optimization Phase: RF measurements collection using a dedicated drive-test apparatus and manual processing and analysis of data logs; and Mature Network Optimization Phase: Application-generated or network-gathered RF measurements collection from a large number of existing customers and automatic processing and visualization.

The optimization methods outlined above rely on manual identification of areas of good signal level and poor signal quality with the added challenge of individual toggling between LTE RSRP and LTE RS SNR and/or LTE RSRQ maps in the case of an LTE network. The same concept applies to all modern wireless technologies, including 5G, UMTS, CDMA, etc.

Presented below is a proposed alternative to existing signal level and quality optimization techniques which offers the ability to identify areas of significant imbalance of signal level and quality. The result is offered in the form of a score ranging from 0% to 100% which represents the normalized deviation of a measurement's signal level and quality from a) the area average signal level and quality and b) the ideal signal level and quality achievable. This calculated score also uses predefined signal quality value thresholds to place higher priority for optimization on areas with considerably degraded quality. In general, areas with a high Optimization Priority value have high signal level but poor quality, which may be improvable through low-cost network changes such as antenna configuration or handoff settings adjustments, rather than the installation of a new cell site. Several examples are provided below with regard to LTE optimization protocols, each of which can be utilized to identify optimization priority. However, LTE optimization may be exchanged for 3G, 4G, 5G, or other standard as appropriate using the same formulae provided.

The area average signal level and quality metric defines the Average RS SNR as a linear function of RSRP. The equation for this line, in particular its slope and intercept, can be determined by finding the best fitting straight line on an RSRP vs RS SNR scatter plot.

The ideal signal level and quality achievable metric (here, with regarding to LTE) is found by first establishing the relationship between RSRP and RS SNR (from the Downlink Power Budget calculation at the Receiver [UE]), or from RSRQ:

Reference Signal Signal-to-Noise Power(RS SNR) [dBm]=Reference Signal Received Power (RSRP)[dBm]−Noise Power($N$)[dB]

Where:

Noise Power($N$)[dB]=Thermal Noise Power+Receiver Noise Figure+Channel Noise

Receiver Noise Figure=7 [dB]

Thermal Noise Power=White Noise Power Spectral Density($N_0$)×Sub-carrier Bandwidth($W$)=−174 [dBm/Hz]+10*log(15,000[Hz])=−132.25[dBm]

Ideally, with Channel Noise equal to zero, the calculated relationship between LTE RSRP and LTE RS SNR can be reduced to: RS $SNR_{[IDEAL]}$=$RSRP_{[ACTUAL]}$−125.25 [dBm]

FIG. 3 provides an example distribution of LTE RSRP and RS SNR measurements 44 collected using drive-test equipment with calculated RS $SNR_{[IDEAL]}$ 43 and Average RS $SNR_{[ACTUAL]}$ 44 computed over the entire sample set, with RS SNR (dB) 41 defined on the y-axis and RSRP (dBm) 42 defined on the x-axis.

Figure 4:
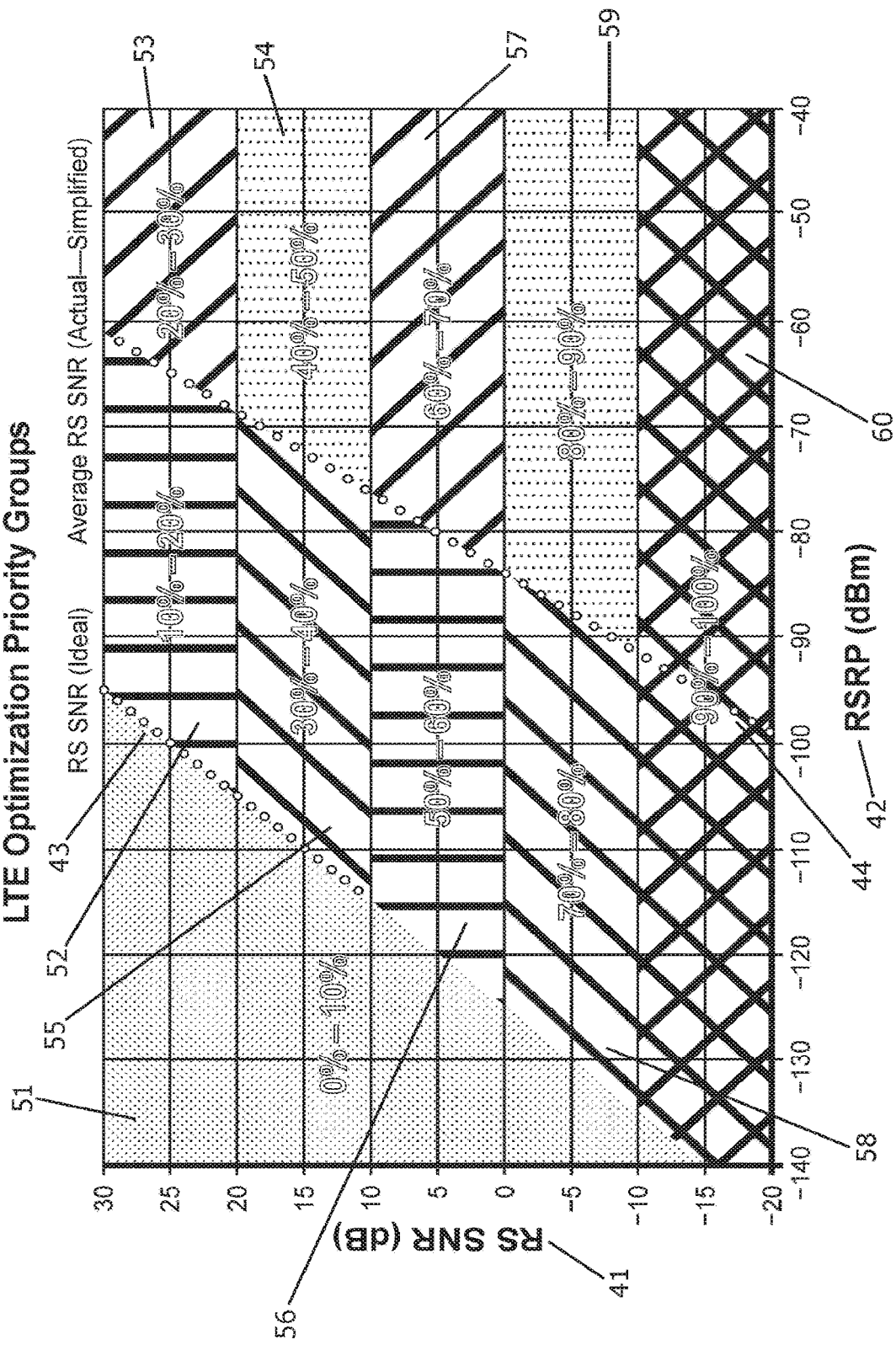
FIG. 4 details an LTE optimization priority chart, outlining different regions of score ranges and their bounds.

To prioritize optimization activities, LTE RS SNR measurements with highest delta from ideal RS SNR (RS $SNR_{[IDEAL]}$) and cluster average RS SNR (Average RS $SNR_{[ACTUAL]}$) can be grouped into several sets (10, for example) yielding equal ranges of normalized scores in 10% increments from 0% to 100%. These ranges are depicted in FIG. 4. The groups of normalized scores can be partitioned based on absolute RS SNR thresholds (−20 dB to −10 dB, −10 dB to 0 dB, etc.) since signal quality has a higher impact than signal level in facilitating high performance of services provided by the wireless carriers.

FIG. 4 provides a visual overview of example thresholds and regions of assigned LTE Optimization Priority, comprising actual data points plotted against RS SNR over RSRP. Ultimately, the optimization, as calculated by the formula are detailed in FIG. 4, which defines optimization priority.

Calculation Methodology

An LTE Optimization Priority score can be calculated for individual measurements of LTE RSRP and corresponding LTE RS SNR values from a set of measurements by way of simple linear functions definition and extrapolation. It is important that the measurements set contains a large number of LTE RSRP and LTE RS SNR samples with a wide variance of values.

There are four possible scenarios that need to be considered which define the formulae for score calculation depending on the slopes of RS $SNR_{[IDEAL]}$ and Average RS $SNR_{[ACTUAL]}$ as well as the value of $RSRP_{[ACTUAL]}$ with respect to the line defined by the Average RS $SNR_{[ACTUAL]}$—Step-by-step formula definitions are provided for each scenario below:

The following formulae define the situation wherein: the priority base=any percentage between 0 and 90 and defines the parameters of the delta min and delta max. This allows the scenario for wherein the delta is equal to actual RS SNR minus ideal RS SNR.

Formula:

The formula for Priority (%) is defined as:

$$\text{Priority (\%)} = \text{Priority}_{BASE} + \text{Priority}_{INCREMENT} \qquad [1]$$

Where:

$Priority_{BASE}$ = Any(10%, 20%, 30%, 40%, 50%, 60%, 70%, 80%, 90%)

$$Priority_{INCREMENT} = 0.1 \times \frac{abs(\Delta) - abs(\Delta_{MIN})}{abs(\Delta_{MAX}) - abs(\Delta_{MIN})} \text{ such that:}$$

when $\Delta = \Delta_{MIN}$ then $Priority_{INCREMENT} = 0\%$ when $\Delta = \Delta_{MAX}$ then $Priority_{INCREMENT} = 10\%$ $\Delta$ = RS $SNR_{ACTUAL}$ − RS $SNR_{IDEAL}$ Let:
a) Average RS $SNR_{ACTUAL}$ be directly proportional to Average RS $SNR_{ACTUAL}$ as a linear function y=m*x+a and defined as:

Average RS $SNR_{ACTUAL}$=$m_{AVERAGE\ RS\ SNR}$×RSRP$_{ACTUAL}$+$a_{AVERAGE\ RS\ SNR}$ [7]

b) RS $SNR_{IDEAL}$ be equal to RSRP$_{ACTUAL}$ offset by 125.2 defined as:

RS $SNR_{IDEAL}$=RSRP$_{ACTUAL}$+125.2 [8]

c) Average RS $SNR_{ACTUAL}$ have a slope smaller than RS $SNR_{IDEAL}$ defined as:

$m_{AVERAGE\ RS\ SNR_{ACTUAL}} < m_{RS\ SNR_{IDEAL}}$ [9]

d) RS $SNR_{ACTUAL}$ be between RS $SNR_{Threshold1}$ (point $y_2$ on y-axis) and RS $SNR_{Threshold2}$ (point $y_3$ on y-axis) defined as:

RS SNR($y_2$)=RS $SNR_{Threshold1}$≤RS $SNR_{ACTUAL}$ [10]

and

RS $SNR_{ACTUAL}$<RS SNR($y_3$)=RS $SNR_{Threshold2}$ [11]

e) RSRP$_{ACTUAL}$ be between RSRP$_{Threshold1}$ (point $x_1$ on x-axis) and RSRP$_{Threshold2}$ (point $x_3$ on x-axis) defined as:

RSRP($x_1$)=RSRP$_{Threshold1}$≤RSSP$_{ACTUAL}$ [12]

and

RSRP$_{ACTUAL}$<RSRP($x_3$)=RSRP$_{Threshold2}$ [13]

Then:
The difference between RS $SNR_{ACTUAL}$ and RS $SNR_{IDEAL}$ is defined as Δ:

Δ=RS $SNR_{ACTUAL}$−RS $SNR_{IDEAL}$=RS $SNR_{ACTUAL}$−RSRP$_{ACTUAL}$−125.2 [14]

In combination with [8], Δ can be simplified as:

Δ=RS $SNR_{ACTUAL}$−RSRP$_{ACTUAL}$−125.2 [15]

The minimum distance ($\Delta_{MIN}$) from RS $SNR_{ACTUAL}$ to RS $SNR_{IDEAL}$ is at point ($x_2$, $y_2$) on line Average RS $SNR_{ACTUAL}$, such that:

$\Delta_{MIN}$=Δ($x_2,y_2$)=Average RS $SNR_{ACTUAL}$($x_2$)−RS $SNR_{IDEAL}$($x_2$) [16]

Using the definition in [7]:

Average RS $SNR_{ACTUAL}$($x_2$) =

$m_{Average\ RS\ SNR_{ACTUAL}} \times RSRP(x_2) + a_{Average\ RS\ SNR_{ACTUAL}}$ =

RS SNR($y_2$)

$$RSRP(x_2) = \frac{RS\ SNR(y_2) - a_{Average\ RS\ SNR_{ACTUAL}}}{m_{Average\ RS\ SNR_{ACTUAL}}}$$

Using the definition in [8]:

RS $SNR_{IDEAL}$($x_2$)=RSRP($x_2$)+125.2 [19]

Combining terms found in [17], [18] and [19] into [16] results in:

$$\Delta_{MIN} = RS\ SNR(y_2) - \frac{RS\ SNR(y_2) - a_{Average\ RS\ SNR_{ACTUAL}}}{m_{Average\ RS\ SNR_{ACTUAL}}} - 125.2$$

Using the limit defined in [10] and re-arranging [20] results in:

$$\Delta_{MIN} = \frac{m_{Average\ RS\ SNR_{ACTUAL}} \times (RS\ SNR_{Threshold1} - 125.2) - (RS\ SNR_{Threshold1} - a_{Average\ RS\ SNR_{ACTUAL}})}{m_{Average\ RS\ SNR_{ACTUAL}}}$$ [21]

The maximum distance ($\Delta_{MAX}$) from RS $SNR_{ACTUAL}$ to RS $SNR_{IDEAL}$ is at point ($x_3$, $y_2$) defined as:

$\Delta_{MAX}$=RS SNR($y_2$)−RS $SNR_{IDEAL}$($x_3$) [22]

Using the relationship between RS $SNR_{IDEAL}$ and RSRP$_{ACTUAL}$ as defined by [8] at point ($x_3$, $y_2$) and the limit of RS $SNR_{ACTUAL}$ [10] and RSRP$_{ACTUAL}$ [13] results in:

RS $SNR_{IDEAL}$($x_3$)=RSRP$_{ACTUAL}$($x_3$)+125.2 [23]

$\Delta_{MAX}$=RS $SNR_{Threshold1}$−RSRP$_{threshold2}$−125.2 [24]

Yielding:
Combining terms found in [15], [21] and [24] into [3] results in:

$$Priority(\%) = Priority_{BASE} + 0.1 \times \frac{abs(RS\ SNR_{ACTUAL} - RSRP_{ACTUAL} - 125.2) - abs\left(\frac{m_{Average\ RS\ SNR_{ACTUAL}} \times (RS\ SNR_{Threshold1} - 125.2) - (RS\ SNR_{Threshold1} - a_{Average\ RS\ SNR_{ACTUAL}})}{m_{Average\ RS\ SNR_{ACTUAL}}}\right)}{abs(RS\ SNR_{Threshold1} - RSRP_{Threshold2} - 125.2) - abs\left(\frac{m_{Average\ RS\ SNR_{ACTUAL}} \times (RS\ SNR_{Threshold1} - 125.2) - (RS\ SNR_{Threshold1} - a_{Average\ RS\ SNR_{ACTUAL}})}{m_{Average\ RS\ SNR_{ACTUAL}}}\right)}$$ [25]

With numerator and denominator simplification in [25]

$$\text{Priority}(\%) = \text{Priority}_{BASE} + \quad [26]$$

$$0.1 \times \frac{\text{abs}(m_{RS\ SNR_{AVERAGE}} \times (RS\ SNR_{ACTUAL} - RSPR_{ACTUAL} - 125.2)) - \text{abs}\left(\begin{array}{c} m_{Average\ RS\ SNR_{ACTUAL}} \times (RS\ SNR_{Threshold1} - 125.2) - \\ (RS\ SNR_{Threshold1} - a_{Average\ RS\ SNR_{ACTUAL}}) \end{array}\right)}{\text{abs}(m_{RS\ SNR_{AVERAGE}} \times (RS\ SNR_{Threshold1} - RSRP_{Threshold2} - 125.2)) - \text{abs}\left(\begin{array}{c} m_{Average\ RS\ SNR_{ACTUAL}} \times (RS\ SNR_{Threshold1} - 125.2) - \\ (RS\ SNR_{Thredhold1} - a_{Average\ RS\ SNR_{ACTUAL}}) \end{array}\right)}$$

Figure 5:
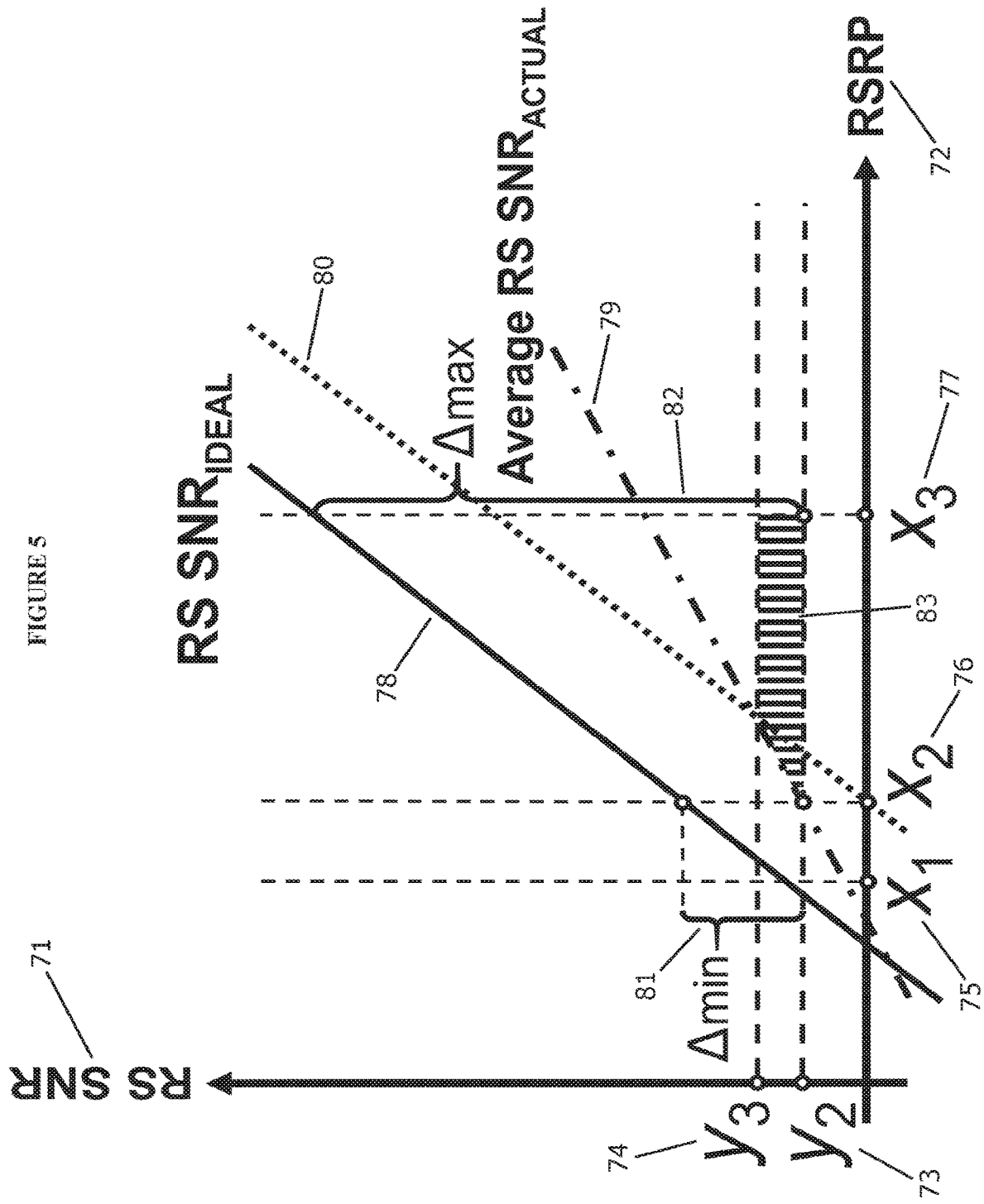
FIG. 5 details a graphical representation of the scenario where the slope of RS $SNR_{[AVERAGE]}$ is lower than the slope of RS $SNR_{[IDEAL]}$ and actual RS SNR.

The calculations of the above formulae are then graphically represented by FIG. 5, depicting the scenario where the slope of RS $SNR_{[AVERAGE]}$ is lower than the slope of RS $SNR_{[IDEAL]}$ and actual RS SNR.

Accordingly, we see that RS $SNR_{[IDEAL]}$ 78 has a first slope and is parallel to slope 80. However, Average RS $SNR_{[ACTUAL]}$ slope 79 is lower than the slope 78 of RS $SNR_{[IDEAL]}$. This provides for data the delta min 81 and the delta max 82 points. This creates a section between $y_2$ 73 and $y_3$ 74 between the points of delta min 81 and delta max 82 that defines the location of the datapoint 83 priority under consideration.

Figure 6:
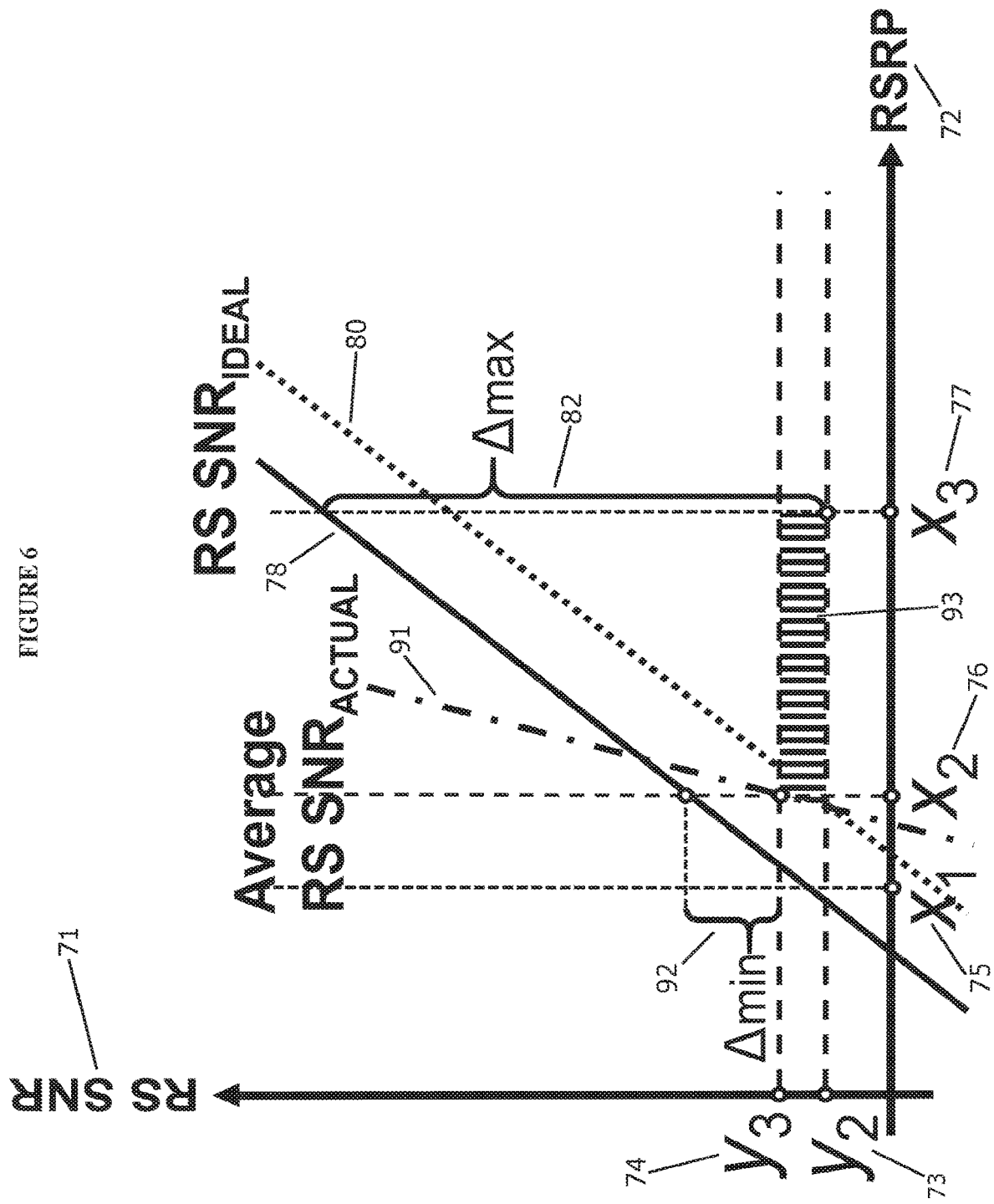
FIG. 6 details a graphical representation of calculations wherein the slope of Average RS $SNR_{[ACTUAL]}$ is greater than the slope of RS $SNR_{[IDEAL]}$ and actual RS SNR is above Average RS SNR.

A further set of formulae to calculate wherein the slope of Average RS $SNR_{[ACTUAL]}$ is greater than the slope of RS $SNR_{[IDEAL]}$ and actual RS SNR is below Average RS SNR. A graphical representation of this solution is depicted in FIG. 6. Herein, the delta min 92 is from point $y_3$ to a point on RS $SNR_{[IDEAL]}$ at $x_2$, and the delta max 82 is from $y_2$ to a point on RS $SNR_{[IDEAL,]}$ at $x_3$. The formulae are defined as:

Formula:
The formula for Priority (%) is defined as:

$$\text{Priority }(\%) = \text{Priority}_{BASE} + \text{Priority}_{INCREMENT} \quad [1]$$

Where:

$$\text{Priority}_{BASE} = \text{Any}(10\%, 20\%, 30\%, 40\%, 50\%, 60\%, 70\%, 80\%, 90\%) \quad [2]$$

$$\text{Priority}_{INCREMENT} = 0.1 \times \frac{\text{abs}(\Delta) - \text{abs}(\Delta_{MIN})}{\text{abs}(\Delta_{MAX}) - \text{abs}(\Delta_{MIN})} \text{ such that:} \quad [3]$$

when $\Delta = \Delta_{MIN}$ then $\text{Priority}_{INCREMENT} = 0\%$ [4]

when $\Delta = \Delta_{MAX}$ then $\text{Priority}_{INCREMENT} = 10\%$ [5]

$$\Delta = RS\ SNR_{ACTUAL} - RS\ SNR_{IDEAL} \quad [6]$$

Let:
a) Average RS $SNR_{ACTUAL}$ be directly proportional to Average RS $SNR_{ACTUAL}$ as a linear function y=m*x+a and defined as:

$$\text{Average RS SNR}_{ACTUAL} = m_{AVERAGE\ RS\ SNR} \times \text{RSRP}_{ACTUAL} a_{AVERAGE\ RS\ SNR} \quad [7]$$

b) RS $SNR_{IDEAL}$ be equal to $RSRP_{ACTUAL}$ offset by 125.2 defined as:

$$RS\ SNR_{IDEAL} = RSRP_{ACTUAL} + 125.2 \quad [8]$$

c) Average RS $SNR_{ACTUAL}$ have a slope smaller than RS $SNR_{IDEAL}$ defined as:

$$m_{AVERAGE\ RS\ SNR_{ACTUAL}} > m_{RS\ SNR_{IDEAL}} \quad [9]$$

d) RS $SNR_{ACTUAL}$ be between RS $SNR_{Threshold1}$ (point $y_2$ on y-axis) and RS $SNR_{Threshold2}$ (point $y_3$ on y-axis) defined as:

$$RS\ SNR(y_2) = RS\ SNR_{Threshold1} < RS\ SNR_{ACTUAL} \quad [10]$$

and $$RS\ SNR_{ACTUAL} < RS\ SNR(y_3) = RS\ SNR_{Threshold2} \quad [11]$$

e) $RSRP_{ACTUAL}$ be between $RSRP_{Threshold1}$ (point $x_1$ on x-axis) and $RSRP_{Threshold2}$ (point $x_3$ on x-axis) defined as:

$$RSRP(x_1) = RSRP_{Threshold1} \leq RSRP_{ACTUAL} \quad [12]$$

and $$RSRP_{ACTUAL} < RSRP(x_3) = RSRP_{Threshold2} \quad [13]$$

Then:
The difference between RS $SNR_{ACTUAL}$ and RS $SNR_{IDEAL}$ is defined as $\Delta$:

$$\Delta = RS\ SNR_{ACTUAL} - RS\ SNR_{IDEAL} = RS\ SNR_{ACTUAL} - RSRP_{ACTUAL} - 125.2 \quad [14]$$

In combination with [8], $\Delta$ can be simplified as:

$$\Delta = RS\ SNR_{ACTUAL} - RSRP_{ACTUAL} - 125.2 \quad [15]$$

The minimum distance ($\Delta_{MIN}$) from RS $SNR_{ACTUAL}$ to RS $SNR_{IDEAL}$ is at point ($x_2$, $y_3$) on line Average RS $SNR_{ACTUAL}$, defined as:

$$\Delta_{MIN} = \Delta(x_2, y_3) = \text{Average RS } SNR_{ACTUAL}(x_2) - RS\ SNR_{IDEAL}(x_2) \quad [16]$$

Using the definition in [7]:

$$\text{Average } RS\ SNR_{ACTUAL}(x_2) = \quad [17]$$
$$m_{Average\ RS\ SNR_{ACTUAL}} \times RSRP(x_2) + a_{Average\ RS\ SNR_{ACTUAL}} = RS\ SNR(y_3)$$

$$RSRP(x_2) = \frac{RS\ SNR(y_3) - a_{Average\ RS\ SNR_{ACTUAL}}}{m_{Average\ RS\ SNR_{ACTUAL}}} \quad [18]$$

Using the definition in [8]:

$$RS\ SNR_{IDEAL}(x_2) = RSRP(x_2) + 125.2 \quad [19]$$

Combining terms found in [17], [18] and [19] into [16] results in:

$$\Delta_{MIN} = RS\ SNR(y_3) - \frac{RS\ SNR(y_3) - a_{Average\ RS\ SNR_{ACTUAL}}}{m_{Average\ RS\ SNR_{ACTUAL}}} - 125.2 \quad [20]$$

Using the limit defined in [10] and re-arranging [20] results in:

$$\Delta_{MIN} = \frac{m_{Average\ RS\ SNR_{ACTUAL}} \times (RS\ SNR_{Threshold2} - 125.2) - (RS\ SNR_{Threshold2} - a_{Average\ RS\ SNR_{ACTUAL}})}{m_{Average\ RS\ SNR_{ACTUAL}}} \quad [21]$$

The maximum distance ($\Delta_{MAX}$) from RS $SNR_{ACTUAL}$ to RS $SNR_{IDEAL}$ is at point ($x_3$, $y_2$) defined as:

$$\Delta_{MAX} = y_2 - RS\ SNR_{IDEAL}(x_3) \quad [22]$$

Using the relationship between RS $SNR_{IDEAL}$ and $RSRP_{ACTUAL}$ as defined by [8] at point ($x_3$, $y_2$) and the limit of RS $SNR_{ACTUAL}$ [10] and $RSRP_{ACTUAL}$ [13] results in:

$$RS\ SNR_{IDEAL}(x_3) = RSRP_{ACTUAL}(x_3) + 125.2 \quad [23]$$

$$\Delta_{MAX} = RS\ SNR_{Threshold1} - RSRP_{Threshold2} - 125.2 \quad [24]$$

Yielding:
Combining terms found in [15], [21] and [24] into [3] results in:

$$Priority(\%) = Priority_{BASE} + 0.1 \times \frac{abs(RS\ SNR_{ACTUAL} - RSRP_{ACTUAL} - 125.2) - abs\left(\frac{m_{Average\ RS\ SNR_{ACTUAL}} \times (RS\ SNR_{Threshold2} - 125.2) - (RS\ SNR_{Threshold2} - a_{Average\ RS\ SNR_{ACTUAL}})}{m_{Average\ RS\ SNR_{ACTUAL}}}\right)}{abs(RS\ SNR_{Threshold1} - RSRP_{Threshold2} - 125.2) - abs\left(\frac{m_{Average\ RS\ SNR_{ACTUAL}} \times (RS\ SNR_{Threshold2} - 125.2) - (RS\ SNR_{Threshold2} - a_{Average\ RS\ SNR_{ACTUAL}})}{m_{Average\ RS\ SNR_{ACTUAL}}}\right)} \quad [25]$$

With numerator and denominator simplification in [25]

$$Priority(\%) = Priority_{BASE} + 0.1 \times \frac{abs(m_{RS\ SNR_{AVERAGE}} \times (RS\ SNR_{ACTUAL} - RSRP_{ACTUAL} - 125.2)) - abs\left(\frac{m_{Average\ RS\ SNR_{ACTUAL}} \times (RS\ SNR_{Threshold2} - 125.2) - (RS\ SNR_{Threshold2} - a_{Average\ RS\ SNR_{ACTUAL}})}{} \right)}{abs(m_{RS\ SNR_{AVERAGE}} \times (RS\ SNR_{Threshold1} - RSRP_{Threshold2} - 125.2)) - abs\left(\frac{m_{Average\ RS\ SNR_{ACTUAL}} \times (RS\ SNR_{Threshold2} - 125.2) - (RS\ SNR_{Thredhold2} - a_{Average\ RS\ SNR_{ACTUAL}})}{}\right)} \quad [26]$$

Figure 7:
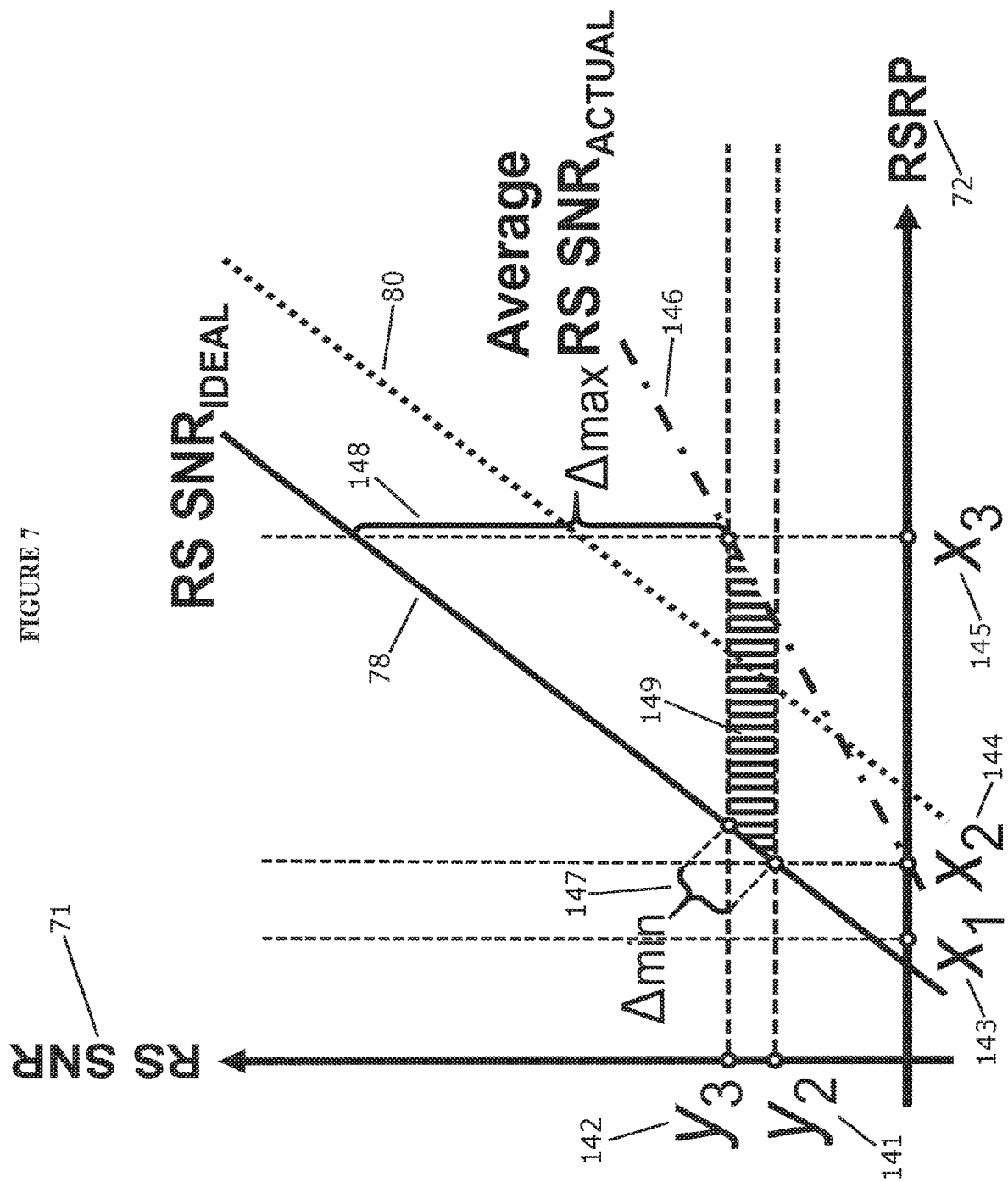
FIG. 7 details a graphical representation of the scenario wherein the slope of the Average RS $SNR_{[ACTUAL]}$ is lower than the slope of RS $SNR_{[IDEAL]}$ and actual RS SNR is above Average RS SNR.

A further scenario exists wherein the slope of the Average RS $SNR_{[ACTUAL]}$ 146 is lower than the slope of RS $SNR_{[IDEAL]}$ 78 and actual RS SNR is above Average RS SNR. FIG. 7 then shows a graphical representation of the same, depicting y2 (141), y3 (142), limits on the $RSRPx_1$ (143), $x_2$ (144), and x3 (145). Which defines the delta min 147, the delta max 148, and an area of 149. The formulae are defined as:
Formula:
The formula for Priority (%) is defined as:

$$Priority\ (\%) = Priority_{BASE} + Priority_{INCREMENT} \quad [1]$$

Where:

$$Priority_{BASE} = Any(10\%, 20\%, 30\%, 40\%, 50\%, 60\%, 70\%, 80\%, 90\%) \quad [2]$$

$$Priority_{INCREMENT} = 0.1 \times \frac{abs(\Delta) - abs(\Delta_{MIN})}{abs(\Delta_{MAX}) - abs(\Delta_{MIN})} \quad \text{such that:} \quad [3]$$

when $\Delta = \Delta_{MIN}$ then $Priority_{INCREMENT} = 0\%$ [4]

when $\Delta = \Delta_{MAX}$ then $Priority_{INCREMENT} = 10\%$ [5]

$$\Delta = RS\ SNR_{ACTUAL} - RS\ SNR_{IDEAL} \quad [6]$$

Let:
a) Average RS $SNR_{ACTUAL}$ be directly proportional to Average RS $SNR_{ACTUAL}$ as a linear function y=m*x+a and defined as:

$$Average\ RS\ SNR_{ACTUAL} = m_{AVERAGE\ RS\ SNR} \times RSRP_{ACTUAL} + a_{AVERAGE\ RS\ SNR} \quad [7]$$

b) RS $SNR_{IDEAL}$ be equal to $RSRP_{ACTUAL}$ offset by 125.2 defined as:

$$RS\ SNR_{IDEAL} = RSRP_{ACTUAL} + 125.2 \quad [8]$$

c) Average RS $SNR_{ACTUAL}$ have a slope smaller than RS $SNR_{IDEAL}$ defined as:

$$m_{AVERAGE\ RS\ SNR_{ACTUAL}} \leq m_{RS\ SNR_{IDEAL}} \quad [9]$$

d) RS $SNR_{ACTUAL}$ be between RS $SNR_{Threshold1}$ (point $y_2$ on y-axis) and RS $SNR_{Threshold2}$ (point $y_3$ on y-axis) defined as:

$$RS\ SNR(y_2) = RS\ SNR_{Threshold1} \leq RS\ SNR_{ACTUAL} \quad [10]$$

and $$RS\ SNR_{ACTUAL} < RS\ SNR(y_3) = RS\ SNR_{Threshold2} \quad [11]$$

e) $RSRP_{ACTUAL}$ be between $RSRP_{Threshold1}$ (point $x_1$ on x-axis) and $RSRP_{Threshold2}$ (point $x_3$ on x-axis) defined as:

$$RSRP(x_1) = RSRP_{Threshold1} \leq RSSP_{ACTUAL} \quad [12]$$

and $$RSRP_{ACTUAL} < RSRP(x_3) = RSRP_{Threshold2} \quad [13]$$

Then:
The difference between RS $SNR_{ACTUAL}$ and RS $SNR_{IDEAL}$ is defined as $\Delta$:

$$\Delta = RS_{SNR_{ACTUAL}} - RS\ SNR_{IDEAL} = RS\ SNR_{ACTUAL} - RSRP_{ACTUAL} - 125.2 \quad [14]$$

In combination with [8], $\Delta$ can be simplified as:

$$\Delta = RS\ SNR_{ACTUAL} - RSRP_{ACTUAL} - 125.2 \quad [15]$$

The minimum distance ($\Delta_{MIN}$) from RS $SNR_{ACTUAL}$ to RS $SNR_{IDEAL}$ is along the line RS $SNR_{IDEAL}$ thus equal to zero:

$$\Delta_{MIN} = 0 \quad [16]$$

The maximum distance ($\Delta_{MAX}$) from RS $SNR_{ACTUAL}$ to RS $SNR_{IDEAL}$ is at point ($x_3$, $y_3$) on line Average RS $SNR_{ACTUAL}$ defined as:

$$\Delta_{MAX} = \Delta(x_3, y_3) = \text{Average RS } SNR_{ACTUAL}(x_3) - RS\ SNR_{IDEAL}(x_3) \quad [17]$$

Using the definition in [7]

$$\text{Average RS } SNR_{ACTUAL}(x_3) = \quad [18]$$
$$m_{\text{Average RS } SNR_{ACTUAL}} \times RSRP(x_3) + a_{\text{Average RS } SNR_{ACTUAL}} = RS\ SNR(y_3)$$

$$RSRP(x_3) = \frac{RS\ SNR(y_3) - a_{\text{Average RS } SNR_{ACTUAL}}}{m_{\text{Average RS } SNR_{ACTUAL}}} \quad [19]$$

Using the definition in [8]:

$$RS\ SNR_{IDEAL}(x_3) = RSRP(x_3) + 125.2 \quad [20]$$

Combining terms found in [18], [19], and [20] into [17] results in:

$$\Delta_{MAX} = RS\ SNR(y_3) - \frac{RS\ SNR(y_3) - a_{\text{Average RS } SNR_{ACTUAL}}}{m_{\text{Average RS } SNR_{ACTUAL}}} - 125.2 \quad [21]$$

Using the limit defined in [11] and re-arranging [21] results in:

$$\Delta_{MAX} = \frac{m_{\text{Average RS } SNR_{ACTUAL}} \times (RS\ SNR_{Threshold2} - 125.2) - (RS\ SNR_{Threshold2} - a_{\text{Average RS } SNR_{ACTUAL}})}{m_{\text{Average RS } SNR_{ACTUAL}}} \quad [22]$$

Yielding:
Combining terms found in [15], [21] and [24] into [3] results in:

$$\text{Priority}(\%) = \text{Priority}_{BASE} + \quad [23]$$
$$0.1 \times \frac{abs(RS\ SNR_{ACTUAL} - RSRP_{ACTUAL} - 125.2)}{abs\left(\frac{m_{\text{Average RS } SNR_{ACTUAL}} \times (RS\ SNR_{Threshold2} - 125.2) - (RS\ SNR_{Threshold2} - a_{\text{Average RS } SNR_{ACTUAL}})}{m_{\text{Average RS } SNR_{ACTUAL}}}\right)}$$

With numerator and denominator simplification in [23]:

$$\text{Priority}(\%) = \text{Priority}_{BASE} + \quad [24]$$
$$0.1 \times \frac{abs\left(m_{\text{Average RS } SNR_{ACTUAL}} \times \begin{pmatrix} RS\ SNR_{ACTUAL} - \\ RSRP_{ACTUAL} - 125.2 \end{pmatrix}\right)}{abs\left(\frac{m_{\text{Average RS } SNR_{ACTUAL}} \times (RS\ SNR_{Threshold2} - 125.2) - (RS\ SNR_{Threshold2} - a_{\text{Average RS } SNR_{ACTUAL}})}{}\right)}$$

Figure 8:
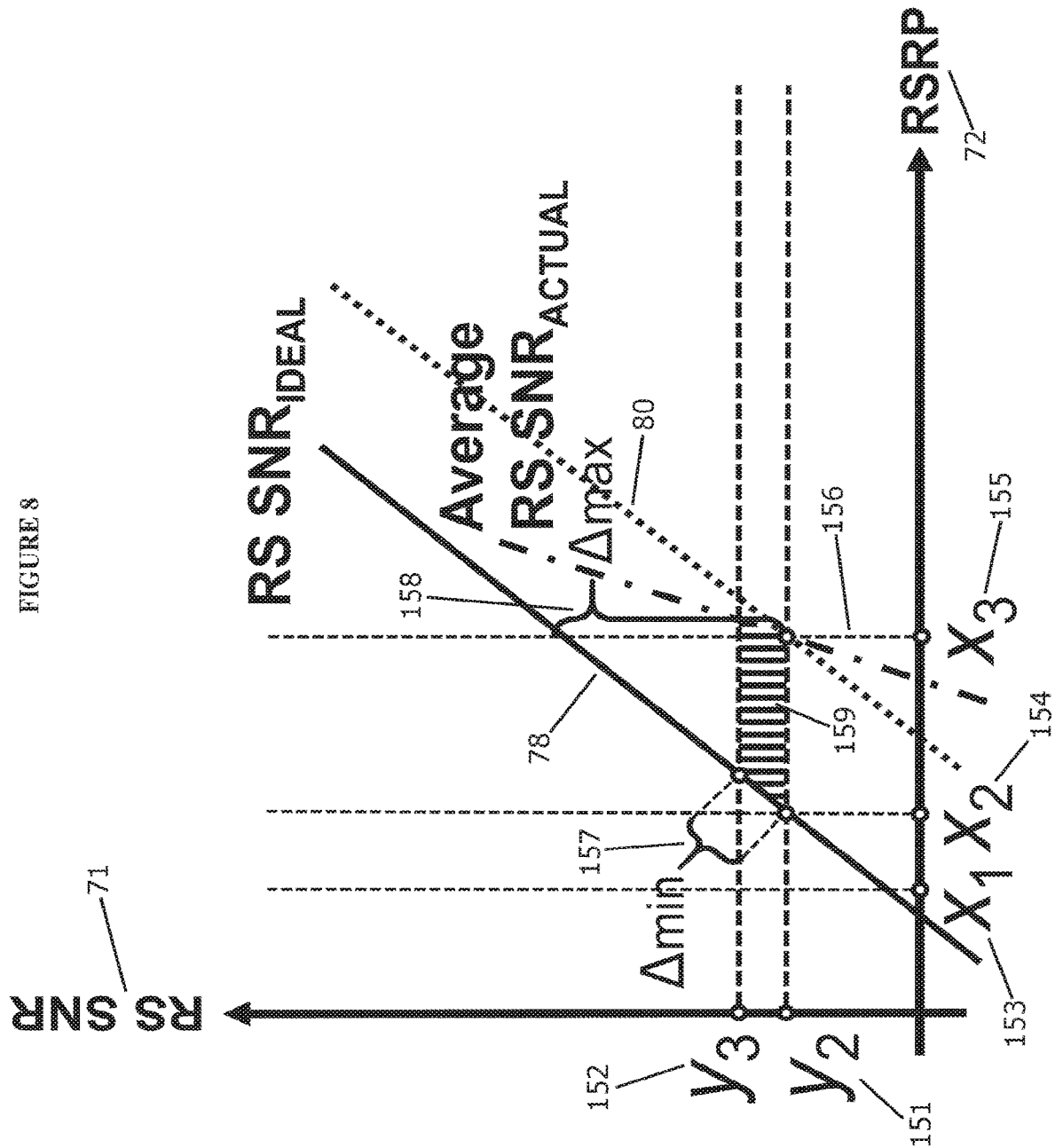
FIG. 8 details a graphical representation of calculation for the scenario wherein the slope of the Average RS $SNR_{[ACTUAL]}$ is greater than the slope of the RS $SNR_{[IDEAL]}$ and actual RS SNR is above Average RS SNR.

Finally, FIG. 8 depict a further scenario wherein the slope of the Average RS $SNR_{[ACTUAL]}$ 156 is greater than the slope of the RS $SNR_{[IDEAL]}$ 78 and actual RS SNR is above Average RS SNR. Thus, FIG. 8 depicts wherein $y_2$ (151) and $y_3$ (152), match with the RSRP variables $x_1$ (153), $x_2$ (154), and $x_3$ (155) to define the delta min 157 and delta max 156, and the area of interest 159. This FIG. 8 is represented by the formulae as:

Formula:
The formula for Priority (%) is defined as:

$$\text{Priority } (\%) = \text{Priority}_{BASE} + \text{Priority}_{INCREMENT} \quad [1]$$

Where:

$$\text{Priority}_{BASE} = \quad [2]$$
$$\text{Any}(10\%, 20\%, 30\%, 40\%, 50\%, 60\%, 70\%, 80\%, 90\%)$$

$$\text{Priority}_{INCREMENT} = 0.1 \times \frac{abs(\Delta) - abs(\Delta_{MIN})}{abs(\Delta_{MAX}) - abs(\Delta_{MIN})} \text{ such that:} \quad [3]$$

when $\Delta = \Delta_{MIN}$ then $\text{Priority}_{INCREMENT} = 0\%$ \quad [4]

when $\Delta = \Delta_{MAX}$ then $\text{Priority}_{INCREMENT} = 10\%$ \quad [5]

$$\Delta = RS\ SNR_{ACTUAL} - RS\ SNR_{IDEAL} \quad [6]$$

Let:
a) Average RS $SNR_{ACTUAL}$ be directly proportional to Average RS $SNR_{ACTUAL}$ as a linear function y=m*x+a and defined as:

$$\text{Average RS } SNR_{ACTUAL} = m_{AVERAGE\ RS\ SNR} \times RSRP_{ACTUAL} + a_{AVERAGE\ RS\ SNR} \quad [7]$$

b) RS $SNR_{IDEAL}$ be equal to $RSRP_{ACTUAL}$ offset by 125.2 defined as:

$$RS\ SNR_{IDEAL} = RSRP_{ACTUAL} + 125.2 \quad [8]$$

c) Average RS $SNR_{ACTUAL}$ have a slope smaller than RS $SNR_{IDEAL}$ defined as:

$$m_{AVERAGE\ RS\ SNR_{ACTUAL}} > m_{RS\ SNR_{IDEAL}} \quad [9]$$

d) RS $SNR_{ACTUAL}$ be between RS $SNR_{Threshold1}$ (point $y_2$ on y-axis) and RS $SNR_{Threshold2}$ (point $y_3$ on y-axis) defined as:

$$RS\ SNR(y_2) = RS\ SNR_{Threshold1} \leq RS\ SNR_{ACTUAL} \quad [10]$$

and $$RS\ SNR_{ACTUAL} < RS\ SNR(y_3) = RS\ SNR_{Threshold2} \quad [11]$$

e) $RSRP_{ACTUAL}$ be between $RSRP_{Threshold1}$ (point $x_1$ on x-axis) and $RSRP_{Threshold2}$ (point $x_3$ on x-axis) defined as:

$$RSRP(x_1) = RSRP_{Threshold1} \leq RSRP_{ACTUAL} \quad [12]$$

and $$RSRP_{ACTUAL} < RSRP(x_3) = RSRP_{Threshold2} \quad [13]$$

Then:
The difference between RS $SNR_{ACTUAL}$ and RS $SNR_{IDEAL}$ is defined as $\Delta$:

$$\Delta = RS\ SNR_{ACTUAL} - RS\ SNR_{IDEAL} = RS\ SNR_{ACTUAL} - RSRP_{ACTUAL} - 125.2 \quad [14]$$

In combination with [8], $\Delta$ can be simplified as:

$$\Delta = RS\ SNR_{ACTUAL} - RSRP_{ACTUAL} - 125.2 \quad [15]$$

The minimum distance ($\Delta_{MIN}$) from RS $SNR_{ACTUAL}$ to RS $SNR_{IDEAL}$ is along the line RS $SNR_{IDEAL}$ thus equal to zero:

$$\Delta_{MIN} = 0 \quad [16]$$

The maximum distance ($\Delta_{MAX}$) from RS $SNR_{ACTUAL}$ to RS $SNR_{IDEAL}$ is at point ($x_3$, $y_2$) on line Average RS $SNR_{ACTUAL}$ defined as:

$$\Delta_{MAX} = \Delta(x_3, y_2) = \text{Average RS } SNR_{ACTUAL}(x_3) - RS\ SNR_{IDEAL}(x_3) \quad [17]$$

Using the definition in [7]

$$\text{Average } RS\ SNR_{ACTUAL}(x_3) = \quad [18]$$
$$m_{Average\ RS\ SNR_{ACTUAL}} \times RSRP(x_3) + a_{Average\ RS\ SNR_{ACTUAL}} = RS\ SNR(y_2)$$

$$RSRP(x_3) = \frac{RS\ SNR(y_2) - a_{Average\ RS\ SNR_{ACTUAL}}}{m_{Average\ RS\ SNR_{ACTUAL}}} \quad [19]$$

Using the definition in [8]:

$$RS\ SNR_{IDEAL}(x_3) = RSRP(x_3) + 125.2 \quad [20]$$

Combining terms found in [18], [19], and [20] into [17] results in:

$$\Delta_{MAX} = RS\ SNR(y_2) - \frac{RS\ SNR(y_2) - a_{Average\ RS\ SNR_{ACTUAL}}}{m_{Average\ RS\ SNR_{ACTUAL}}} - 125.2 \quad [21]$$

Using the limit defined in [10] and re-arranging [21] results in:

$$\Delta_{MAX} = \frac{m_{Average\ RS\ SNR_{ACTUAL}} \times (RS\ SNR_{Threshold1} - 125.2) - (RS\ SNR_{Threshold1} - a_{Average\ RS\ SNR_{ACTUAL}})}{m_{Average\ RS\ SNR_{ACTUAL}}} \quad [22]$$

Yielding:
Combining terms found in [15], [21] and [24] into [3] results in:

$$\text{Priority}(\%) = \text{Priority}_{BASE} + \quad [23]$$
$$0.1 \times \frac{abs(RS\ SNR_{ACTUAL} - RSRP_{ACTUAL} - 125.2)}{abs\left(\frac{m_{Average\ RS\ SNR_{ACTUAL}} \times (RS\ SNR_{Threshold1} - 125.2) - (RS\ SNR_{Threshold1} - a_{Average\ RS\ SNR_{ACTUAL}})}{m_{Average\ RS\ SNR_{ACTUAL}}}\right)}$$

With numerator and denominator simplification in [23]:

$$\text{Priority}(\%) = \text{Priority}_{BASE} + \quad [24]$$
$$0.1 \times \frac{abs\left(m_{Average\ RS\ SNR_{ACTUAL}} \times \left(\begin{array}{c} RS\ SNR_{ACTUAL} - \\ RSRP_{ACTUAL} - 125.2 \end{array}\right)\right)}{abs\left(\begin{array}{c} m_{Average\ RS\ SNR_{ACTUAL}} \times (RS\ SNR_{Threshold1} - 125.2) - \\ (RS\ SNR_{Threshold1} - a_{Average\ RS\ SNR_{ACTUAL}}) \end{array}\right)}$$

Accordingly, based upon a data point we can calculate the optimization priority for all data points. This allows providers to identify those networks that can be optimized with the greatest efficiency to improve service. This gives such providers a huge improvement in the manner in which they optimize any given data point.

Accordingly, a scenario to identify the use cases for the above formulae and the corresponding graphical depictions is wherein a data set of 1000 measurements exists, with each measurement having an RSRP and a corresponding RS SNR. The group of 1000 measurements are plotted on an RSRP over RS SNR plot and a generates a line that best fits the scatter plot. This line is the Average RS SNR as a function of RSRP, as depicted in the plot figures. We then compare the slope of this line to the line defined by the Idea Rs SNR, which is also a function of RSRP. Using y2, y3 and x2, x3 limits we find the location of delta_min and delta_max. The shaded area as depicted in FIGS. 5-8 is the location of the some of the 1000 measurements that fall within they and x limits. We calculate Optimization Priority for points that are within the shaded area.

Accordingly, when capturing a set of measurements, we can utilize the formulae defined herein to generate graphical plots that define an optimization priority for the datapoint within the data set. This allows an entity to evaluate a data set and to define how to priority optimization of the data sets.

What is claimed is:

1. A method for identifying an optimization priority for a plurality of given measurements within a dataset of wireless measurements from a wireless network comprising:
   receiving Reference Signal Received Power (RSRP) measurements and Reference Signal Signal-to-Noise (RS SNR) measurements from a plurality of mobile devices within a geographical area of interest;
   creating the dataset of wireless measurements by pairing received RSRP measurements and received RS SNR measurements into a plurality of datapoints, each datapoint, when plotted on a RS SNR (y-axis) vs RSRP (x-axis) chart, having an x value corresponding to a received RSRP measurement and a y value corresponding to a received RS SNR measurement;
   using the datapoints in the dataset to determine a best-fit line for the dataset, the best-fit line being based on the RS SNR measurements to yield an aggregate average (RS SNR$_{[AVERAGE]}$) as a linear function of the RSRP measurements and having a slope and an intercept when plotted on the RS SNR (y-axis) vs RSRP (x-axis) chart;
   subtracting a value for thermal noise power from the RSRP measurement to determine a linear relationship between the RSRP measurements and achievable RS SNR to yield an ideal RS SNR (RS SNR$_{[IDEAL]}$) for the dataset, with the RS SNR$_{[IDEAL]}$ being a straight interpolated line and having a slope and an intercept when plotted on the RS SNR (y-axis) vs RSRP (x-axis) chart;
   iteratively selecting datapoints within the dataset to correspond to the plurality of given measurements;
   calculating an optimization priority score for each of the plurality of given measurements, the optimization priority score identifying if there is a significant imbalance between the RSRP measurement and the RS SNR measurement of each given measurement, wherein one of four scenarios exist, comprising: (1) the slope of RS SNR$_{[AVERAGE]}$ is lower than the slope of RS SNR$_{[IDEAL]}$ and the RS SNR value for the given measurement is higher than the RS SNR value on the RS SNR$_{[AVERAGE]}$ line at the RSRP value of the given measurement; (2) the slope of RS SNR$_{[AVERAGE]}$ is higher than the slope of RS SNR$_{[IDEAL]}$ and the RS SNR value for the given measurement is higher than the RS SNR value on the RS SNR$_{[AVERAGE]}$ line at the RSRP value of the given measurement; (3) the slope of RS SNR$_{[AVERAGE]}$ is lower than the slope of RS SNR$_{[IDEAL]}$ and the RS SNR value for the given measurement is lower than the RS SNR value on the RS SNR$_{[AVERAGE]}$ line at the RSRP value of the given measurement; or (4) the slope of RS SNR$_{[AVERAGE]}$ is higher than the slope of RS SNR$_{[IDEAL]}$ and the RS SNR value for the given measurement is lower than the RS SNR value on the RS SNR$_{[AVERAGE]}$ line at the RSRP value of the given measurement; and adjusting configurations of the wireless network for geographical sub-areas associated with the plurality of given measurements based on the corresponding optimization priority score.

2. The method of claim 1, wherein calculating the optimization priority score of each of the plurality of given measurements comprises, for each datapoint of a subset of the datapoints having the RS SNR measurement bound between an upper signal quality threshold and a lower signal quality threshold and the RS SNR measurement being lower than the RS SNR$_{[AVERAGE]}$ corresponding to the RSRP measurement paired with the RS SNR measurement:

determining a measured signal quality delta between the RS SNR measurement and the RS SNR$_{[IDEAL]}$ corresponding to the RSRP measurement paired with the RS SNR measurement;

determining a minimum signal quality delta among a plurality of deltas between the plurality of RS SNR measurements in the subset and the RS SNR$_{[IDEAL]}$ corresponding to the plurality of RSRP measurements paired with the plurality of RS SNR measurements in the subset;

determining a maximum signal quality delta among the plurality of deltas; and determining a ratio of a first deviation and a second deviation as a normalized signal quality difference for the datapoint, wherein the first deviation comprises differences between the measured signal quality delta for the datapoint and the minimum signal quality delta, and the second deviation comprises differences between the maximum signal quality delta and the minimum signal quality delta.

3. The method of claim 2, wherein calculating the optimization priority score of each of the plurality of given measurements further comprises:

adding the normalized signal quality difference for each datapoint of the subset of datapoints to a base optimization priority score associated with the subset having the RS SNR measurements bound between the upper signal quality threshold and the lower signal quality threshold, and wherein the base optimization priority score becomes progressively lower as the upper signal quality threshold and the lower signal quality threshold progressively increase.

4. The method of claim 1, wherein calculating the optimization priority score of each of the plurality of given measurements comprises, for each datapoint of a subset of the datapoints having the RS SNR measurement bound between an upper signal quality threshold and a lower signal quality threshold and the RS SNR measurement being higher than the RS SNR$_{[AvERAGE]}$ corresponding to the RSRP measurement paired with the RS SNR measurement:

determining a measured signal quality delta between the RS SNR measurement and the RS SNR$_{[IDEAL]}$ corresponding to the RSRP measurement paired with the RS SNR measurement;

determining a minimum signal quality delta among a plurality of deltas between the plurality of RS SNR measurements in the subset and the RS SNR$_{[IDEAL]}$ corresponding to the plurality of RSRP measurements paired with the plurality of RS SNR measurements in the subset;

determining a maximum signal quality delta among the plurality of deltas; and determining a ratio of a first deviation and a second deviation as a normalized signal quality difference for the datapoint, wherein the first deviation comprises differences between the measured signal quality delta for the datapoint and the minimum signal quality delta, and the second deviation comprises differences between the maximum signal quality delta and the minimum signal quality delta.

5. The method of claim 4, wherein calculating the optimization priority score of each of the plurality of given measurements further comprises:

adding the normalized signal quality difference for each datapoint of the subset of datapoints to a base optimization priority score associated with the subset having the RS SNR measurements bound between the upper signal quality threshold and the lower signal quality threshold, and wherein the base optimization priority score becomes progressively lower as the upper signal quality threshold and the lower signal quality threshold progressively increase.

6. The method of claim 1, further comprising calculating an indoor confidence level, and using the indoor confidence level together with the optimization priority score to assess overall network service in both indoor and outdoor locations within the area of interest.

7. A method of determining an optimization priority score for wireless network solutions comprising:

collecting a plurality of measurements relating to signal level and signal quality from a plurality of mobile devices while in an area of interest;

determining a result, wherein the result is offered in the form of a calculated score ranging from 0% to 100% which represents the normalized deviations of a measurement's signal quality from a) a calculation of an area average signal quality and b) a calculation of an ideal signal quality achievable, wherein the calculated score also uses predefined signal quality value thresholds to place higher priority for optimization on areas with a larger imbalance between the signal level and the signal quality; and for areas with a high calculated score value based on a high signal level and a high values of the normalized deviations, selecting a performance modification from a group of network changes comprising antenna configuration, —or handoff settings adjustments.

8. A method for identifying an optimization priority for a dataset of wireless measurements from a wireless network, the method comprising:

collecting the dataset of wireless measurements from a plurality of mobile devices, the wireless measurements taken within an area of interest, each of the wireless measurements including a signal level and an associated signal quality;

calculating an optimization priority score of each wireless measurement from the dataset of wireless measurements, by comparing the signal level to the signal quality of the wireless measurement, the optimization priority score identifying whether there is a significant imbalance between the signal level and the signal quality;

wherein the optimization priority score is calculated under one or more of four scenarios exist:

1. a slope of an average of the signal qualities over the range of signal levels from the data set of wireless measurements is lower than a slope of ideal signal qualities over the range of the signal levels and the signal qualities associated with a subset of the range 1. of the signal levels are higher than the corresponding values of the average signal qualities;
2. the slope of the average signal qualities over the range of the signal levels is higher than the slope of the ideal signal qualities over the range of signal levels and the signal qualities associated with a subset of the range of the signal levels are higher than the corresponding values of the average signal qualities;
3. the slope of the average signal qualities over the range of signal levels is lower than the slope of the ideal signal qualities over the range of signal levels and the signal qualities associated with a subset of the range of the signal levels are lower than the corresponding values of the average signal qualities; and
4. the slope of the average signal qualities over the range of signal levels is higher than the slope of the ideal signal qualities over the range of signal levels and the signal qualities associated with a subset of the range of the signal levels are lower than the corresponding values of the average signal qualities; and adjusting configurations of the wireless network for geographical areas associated with the dataset of wireless measurements based on the optimization priority score.

9. The method of claim 8, wherein the signal level for each of the wireless measurements comprises Reference Signal Received Power, RSRP.

10. The method of claim 8, wherein the signal quality for each of the wireless measurements comprises Reference Signal Signal-to-Noise Ratio RS SNR.

11. The method of claim 8 wherein the signal quality for each of the wireless measurements comprises Reference Signal Received Quality, RSRQ.

12. The method of claim 8 wherein the signal level and the signal quality for each of the wireless measurements are selected from the group comprising: RSSI, RxLev, Eclo, SS-RSRP, and SS-SINR.

* * * * *